United States Patent
Chandler et al.

(10) Patent No.: US 12,511,541 B2
(45) Date of Patent: *Dec. 30, 2025

(54) VISUAL SIGN LANGUAGE TRANSLATION TRAINING DEVICE AND METHOD

(71) Applicant: Avodah, Inc., Wilmington, DE (US)

(72) Inventors: Trevor Chandler, Thornton, CO (US); Dallas Nash, Frisco, TX (US); Michael Menefee, Richardson, TX (US)

(73) Assignee: Avodah, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/596,618

(22) Filed: Mar. 5, 2024

(65) Prior Publication Data

US 2025/0005351 A1   Jan. 2, 2025

Related U.S. Application Data

(63) Continuation of application No. 17/347,351, filed on Jun. 14, 2021, now Pat. No. 11,928,592, which is a
(Continued)

(51) Int. Cl.
*G06V 40/20* (2022.01)
*G06F 18/21* (2023.01)
(Continued)

(52) U.S. Cl.
CPC ............ *G06N 3/08* (2013.01); *G06F 18/214* (2023.01); *G06F 18/217* (2023.01);
(Continued)

(58) Field of Classification Search
CPC .......... G06N 3/08; G06N 20/00; G06N 3/044; G06N 3/045; G06F 18/214; G06F 18/217;
(Continued)

(56) References Cited

U.S. PATENT DOCUMENTS

| | | |
|---|---|---|
| 5,481,454 A | 1/1996 | Inoue et al. |
| 5,544,050 A | 8/1996 | Abe et al. |

(Continued)

FOREIGN PATENT DOCUMENTS

WO   2015191468 A1   12/2015

OTHER PUBLICATIONS

Menefee, M. et al. U.S. Appl. No. 16/694,965, Notice of Allowance Mailed Nov. 10, 2020, (pp. 1-6).

(Continued)

*Primary Examiner* — Aaron W Carter
(74) *Attorney, Agent, or Firm* — Perkins Coie LLP

(57) ABSTRACT

Methods, devices and systems for training a pattern recognition system are described. In one example, a method for training a sign language translation system includes generating a three-dimensional (3D) scene that includes a 3D model simulating a gesture that represents a letter, a word, or a phrase in a sign language. The method includes obtaining a value indicative of a total number of training images to be generated, using the value indicative of the total number of training images to determine a plurality of variations of the 3D scene for generating of the training images, applying each of plurality of variations to the 3D scene to produce a plurality of modified 3D scenes, and capturing an image of each of the plurality of modified 3D scenes to form the training images for a neural network of the sign language translation system.

17 Claims, 20 Drawing Sheets

Related U.S. Application Data continuation of application No. 16/410,147, filed on May 13, 2019, now Pat. No. 11,036,973, which is a continuation of application No. 16/258,531, filed on Jan. 25, 2019, now Pat. No. 10,289,903.

(60) Provisional application No. 62/654,174, filed on Apr. 6, 2018, provisional application No. 62/629,398, filed on Feb. 12, 2018.

(51) Int. Cl.
| | |
|---|---|
| *G06F 18/214* | (2023.01) |
| *G06F 18/2413* | (2023.01) |
| *G06N 3/08* | (2023.01) |
| *G06N 20/00* | (2019.01) |
| *G06T 17/00* | (2006.01) |
| *G06V 10/764* | (2022.01) |

(52) U.S. Cl.
CPC ....... *G06F 18/24133* (2023.01); *G06N 20/00* (2019.01); *G06T 17/00* (2013.01); *G06V 10/764* (2022.01); *G06V 40/28* (2022.01)

(58) Field of Classification Search
CPC . G06F 18/24133; G06T 17/00; G06V 10/764; G06V 40/28
See application file for complete search history.

(56) References Cited

U.S. PATENT DOCUMENTS

| | | | |
|---|---|---|---|
| 5,659,764 | A | 8/1997 | Sakiyama et al. |
| 5,887,069 | A | 3/1999 | Sakou et al. |
| 6,477,239 | B1 | 11/2002 | Ohki et al. |
| 6,628,244 | B1 | 9/2003 | Hirosawa |
| 7,027,054 | B1 | 4/2006 | Cheiky et al. |
| 7,702,506 | B2 | 4/2010 | Yoshimine |
| 8,553,037 | B2 | 10/2013 | Smith et al. |
| 8,751,215 | B2 | 6/2014 | Tardif |
| D719,472 | S | 12/2014 | Sakaue et al. |
| D721,290 | S | 1/2015 | Varacca |
| D722,315 | S | 2/2015 | Liang et al. |
| D752,460 | S | 3/2016 | Gnauck |
| 9,305,229 | B2 | 4/2016 | DeLean et al. |
| 9,715,252 | B2 | 7/2017 | Reeves et al. |
| 10,037,458 | B2 | 7/2018 | Mahmoud et al. |
| 10,176,366 | B1* | 1/2019 | Maxwell ............... G06V 40/20 |
| 10,289,903 | B1 | 5/2019 | Chandler et al. |
| 10,304,208 | B1 | 5/2019 | Chandler et al. |
| 10,346,198 | B1 | 7/2019 | Chandler et al. |
| 10,489,639 | B2 | 11/2019 | Menefee et al. |
| 10,521,264 | B2 | 12/2019 | Chandler et al. |
| 10,521,928 | B2 | 12/2019 | Chandler et al. |
| 10,580,213 | B2 | 3/2020 | Browy et al. |
| 10,599,921 | B2 | 3/2020 | Menefee et al. |
| 10,956,725 | B2 | 3/2021 | Menefee et al. |
| 11,036,973 | B2 | 6/2021 | Chandler et al. |
| 11,055,521 | B2* | 7/2021 | Chandler ............... G06V 40/28 |
| 11,557,152 | B2* | 1/2023 | Menefee ................... G06T 7/73 |
| 11,954,904 | B2* | 4/2024 | Chandler ............ G06V 10/764 |
| 12,183,123 | B2* | 12/2024 | Menefee ................ G06F 3/017 |
| 2002/0069067 | A1 | 6/2002 | Klnefelter |
| 2003/0191779 | A1 | 10/2003 | Sagawa et al. |
| 2004/0210603 | A1 | 10/2004 | Roston |
| 2005/0258319 | A1 | 11/2005 | Jeong |
| 2006/0134585 | A1 | 6/2006 | Adamo-Villani et al. |
| 2006/0139348 | A1 | 6/2006 | Harada et al. |
| 2006/0204033 | A1 | 9/2006 | Yoshimine |
| 2008/0013793 | A1 | 1/2008 | Hillis et al. |
| 2008/0013826 | A1 | 1/2008 | Hillis et al. |
| 2008/0024388 | A1 | 1/2008 | Bruce |
| 2009/0022343 | A1 | 1/2009 | Van Schaack et al. |
| 2010/0044121 | A1 | 2/2010 | Simon et al. |
| 2011/0221974 | A1 | 9/2011 | Stem |
| 2011/0228463 | A1 | 9/2011 | Matagne |
| 2011/0274311 | A1 | 11/2011 | Lee |
| 2011/0301934 | A1 | 12/2011 | Tardif |
| 2012/0206456 | A1 | 8/2012 | Crocket |
| 2012/0206457 | A1 | 8/2012 | Crocker |
| 2013/0100130 | A1 | 4/2013 | Crocker |
| 2013/0124149 | A1 | 5/2013 | Carr et al. |
| 2013/0318525 | A1 | 11/2013 | Palanisamy |
| 2014/0101578 | A1 | 4/2014 | Kwak |
| 2014/0225890 | A1 | 8/2014 | Ronot et al. |
| 2014/0253429 | A1 | 9/2014 | Dai et al. |
| 2014/0309870 | A1 | 10/2014 | Ricci et al. |
| 2015/0092008 | A1 | 4/2015 | Manley |
| 2015/0187135 | A1 | 7/2015 | Magder et al. |
| 2015/0244940 | A1 | 8/2015 | Lombardi et al. |
| 2015/0317304 | A1 | 11/2015 | An et al. |
| 2015/0324002 | A1 | 11/2015 | Quiet et al. |
| 2016/0042228 | A1 | 2/2016 | Opalka et al. |
| 2016/0267349 | A1 | 9/2016 | Shoaib |
| 2016/0320852 | A1 | 11/2016 | Poupyrev |
| 2017/0061249 | A1* | 3/2017 | Estrada ................ G06V 10/454 |
| 2017/0090995 | A1 | 3/2017 | Jubinski |
| 2017/0206405 | A1 | 7/2017 | Molchanov et al. |
| 2017/0220836 | A1 | 8/2017 | Phillips et al. |
| 2017/0236450 | A1 | 8/2017 | Jung et al. |
| 2017/0255832 | A1 | 9/2017 | Jones et al. |
| 2017/0351910 | A1 | 12/2017 | Elwazer et al. |
| 2018/0018529 | A1 | 1/2018 | Hiramatsu |
| 2018/0032846 | A1 | 2/2018 | Yang et al. |
| 2018/0101520 | A1 | 4/2018 | Fuchizaki |
| 2018/0107901 | A1 | 4/2018 | Nakamura et al. |
| 2018/0144214 | A1 | 5/2018 | Hsieh et al. |
| 2018/0181809 | A1 | 6/2018 | Ranjan et al. |
| 2018/0373985 | A1 | 12/2018 | Yang et al. |
| 2018/0374236 | A1 | 12/2018 | Ogata et al. |
| 2019/0026956 | A1 | 1/2019 | Gausebeck et al. |
| 2019/0043472 | A1 | 2/2019 | Garcia |
| 2019/0066733 | A1 | 2/2019 | Somanath et al. |
| 2019/0238568 | A1* | 8/2019 | Goswami .............. G06F 21/566 |
| 2019/0251343 | A1 | 8/2019 | Menefee et al. |
| 2019/0251344 | A1 | 8/2019 | Menefee et al. |
| 2019/0251702 | A1 | 8/2019 | Chandler et al. |
| 2019/0332419 | A1 | 10/2019 | Chandler et al. |
| 2020/0005028 | A1 | 1/2020 | Gu |
| 2020/0034609 | A1 | 1/2020 | Chandler et al. |
| 2020/0104582 | A1 | 4/2020 | Menefee et al. |
| 2020/0126250 | A1 | 4/2020 | Chandler et al. |
| 2020/0387697 | A1* | 12/2020 | Chandler ............... G06N 3/044 |
| 2021/0182664 | A1* | 6/2021 | Kim ........................ G06N 3/08 |
| 2021/0279454 | A1* | 9/2021 | Menefee ................... G06T 7/20 |
| 2021/0374393 | A1 | 12/2021 | Chandler et al. |
| 2022/0036050 | A1 | 2/2022 | Chandler et al. |
| 2023/0377376 | A1* | 11/2023 | Menefee .............. G09B 21/009 |

OTHER PUBLICATIONS

Menefee, M. et al. U.S. Appl. No. 16/694,965 Non-Final Office Action Mailed Mar. 5, 2020 (pp. 1-6).

Menefee, M. et al., Design U.S. Appl. No. 29/678,367, Non-Final Office Action Mailed Apr. 6, 2020, (pp. 1-28).

Menefee, M. et al., Design U.S. Appl. No. 29/678,367, Notice of Allowance, Mailed Oct. 22, 2020, (pp. 1-7).

International Application No. PCT/US2019/017299, International Preliminary Report on Patentability Mailed Aug. 27, 2020 (pp. 1-9).

International Application No. PCT/US2020/016271, International Search Report and Written Opinion, Mailed Jun. 30, 2020 (pp. 1-12).

International Application No. PCT/US2019/017299, International Search Report and Written Opinion Mailed May 31, 2019 (12 pages).

Menefee, M. et al. U.S. Appl. No. 16/270,540, Non-Final Office Action Mailed Jul. 29, 2019, (9 pages).

Chandler, T. et al. U.S. Appl. No. 16/270,532, Notice of Allowance Mailed Aug. 12, 2019, (11 pages).

(56) References Cited

OTHER PUBLICATIONS

Chandler, T. et al. U.S. Appl. No. 16/505,484, Notice of Allowance Mailed Aug. 21, 2019, (16 pages).

* cited by examiner

VISUAL SIGN LANGUAGE TRANSLATION TRAINING DEVICE AND METHOD

CROSS-REFERENCE TO RELATED APPLICATIONS

This patent document is a continuation of U.S. patent application Ser. No. 17/347,351, entitled "VISUAL SIGN LANGUAGE TRANSLATION TRAINING DEVICE AND METHOD", and filed Jun. 14, 2021, which is a continuation of U.S. patent application Ser. No. 16/410,147, entitled "VISUAL SIGN LANGUAGE TRANSLATION TRAINING DEVICE AND METHOD", and filed on May 13, 2019, now U.S. Pat. No. 11,036,973 which is a continuation of U.S. patent application Ser. No. 16/258,531, entitled "VISUAL SIGN LANGUAGE TRANSLATION TRAINING DEVICE AND METHOD" and filed on Jan. 25, 2019, now U.S. Pat. No. 10,289,903 which claims the benefits and priority of U.S. Provisional Patent Application No. 62/654,174 entitled "OPTIMIZING TRAINING FOR VISUAL SIGN LANGUAGE," filed Apr. 6, 2018 and U.S. Provisional Patent Application No. 62/629,398 entitled "INTERACTIVE AUTOMATED SIGN LANGUAGE TRANSLATION METHOD AND APPARATUS," filed Feb. 12, 2018. The entire contents of the before-mentioned patent applications are incorporated by reference as part of the disclosure of this patent document.

TECHNICAL FIELD

This document generally relates to automated pattern and gesture recognition, and more particularly to improving training of automated pattern and gesture recognition systems that utilize neural networks.

BACKGROUND

Computer vision is an interdisciplinary field that deals with how computers can gain high-level understanding from digital images or videos. Computer vision tasks include methods for acquiring, processing, analyzing and understanding digital images, and extraction of high-dimensional data from the real world in order to produce numerical or symbolic information. From the perspective of engineering, computer vision techniques seek to automate tasks that the human visual system can do, such as pattern recognition for recognizing patterns and regularities in data, and gesture recognition for interpreting human gestures via mathematical algorithms.

One specification application of automated pattern and gesture recognition is sign language translation. A sign language (also known as a signed language) is a language that uses manual communication to convey meaning, ideas and thoughts, which simultaneously employs hand gestures, movement, orientation of the fingers, arms or body, and facial expressions to convey a speaker's ideas. Pattern and gesture recognition techniques can facilitate the automated translation of sign languages.

SUMMARY

Disclosed are devices, systems and methods for improving the training of automated pattern and gesture recognition systems. The disclosed techniques can be applied in various embodiments, such as interactive automated sign language translation and communication, to improve the performance and accuracy of a recognition system and allow the system to recognize a larger number of characteristics more accurately and more efficiently.

One aspect of the disclosed technology relates to an apparatus for training a sign language translation system that a processor and a memory including processor executable code. The processor executable code, upon execution by the processor, causes the processor to generate a three-dimensional (3D) scene that includes a 3D model representing at least a part of a human body. The 3D model is positioned in the 3D scene to simulate a gesture that represents a letter, a word, or a phrase in a sign language. The processor executable code, upon execution by the processor, also configures the processor to obtain a value indicative of a total number of training images to be generated, use the value indicative of the total number of training images to determine a plurality of variations of the 3D scene for generating of the training images, apply each of plurality of variations to the 3D scene to produce a plurality of modified 3D scenes, and capture an image of each of the plurality of modified 3D scenes to form the training images for a neural network of the sign language translation system.

Another aspect of the disclosed technology relates to a method for providing training images for training a neural network of a sign language translation system. The method includes generating a three-dimensional (3D) scene that includes a 3D model representing at least a part of a human body. The 3D model is positioned in the 3D scene to simulate a gesture that represents a letter, a word, or a phrase in a sign language. The method also includes obtaining a value indicative of a total number of training images to be generated, using the value indicative of the total number of training images to determine a plurality of variations of the 3D scene for generating of the training images, applying each of plurality of variations to the 3D scene to produce a plurality of modified 3D scenes, and capturing an image of each of the plurality of modified 3D scenes to form the training images for a neural network of the sign language translation system.

Another aspect of the disclosed technology relates to a non-transitory computer readable medium having code stored thereon. The code, upon execution by a processor, causes the processor to implement a method that includes generating a three-dimensional (3D) scene that includes a 3D model representing at least a part of a human body, wherein the 3D model positioned in the 3D scene to simulate a gesture that represents a letter, a word, or a phrase in a sign language, obtaining a value indicative of a total number of training images to be generated, using the value indicative of the total number of training images to determine a plurality of variations of the 3D scene for generating of the training images, applying each of plurality of variations to the 3D scene to produce a plurality of modified 3D scenes, and capturing an image of each of the plurality of modified 3D scenes to form the training images for a neural network of the sign language translation system.

Yet another aspect of the disclosed technology relates to an apparatus for training a pattern recognition system having a neural network engine. The apparatus includes one or more processors and a memory including processor executable code. The processor executable code, upon execution by the one or more processors, causes the one or more processors to generate a three-dimensional (3D) scene that includes a 3D model representing an object. The 3D model includes a plurality of polygonal subsections that collectively form the object. The processor executable code, upon execution by the one or more processors, also causes the one or more processors to determine a total number of training images to be generated for training the neural network, determine, based on the total number of training images, a plurality of parameter variations, and applying each of plurality of the parameter variations to the 3D scene to produce a plurality of modified 3D scenes. The modified 3D scenes include at least one set of variations to a spatial position of the moving object in accordance with a temporal sequence. The processor executable code, upon execution by the one or more processors, also causes the one or more processors to capture an image of each of the plurality of modified 3D scenes to form the training images for the neural network learning engine, and, for each of the training images, automatically generate a label that corresponds to a feature of interest of the 3D model. The label includes one or more bounding lines that delineates a precise boundary of the feature of interest by combining an integer number of polygonal subsections of the 3D model.

These and other features of the disclosed technology are described in the present document.

DETAILED DESCRIPTION

Figure 1:
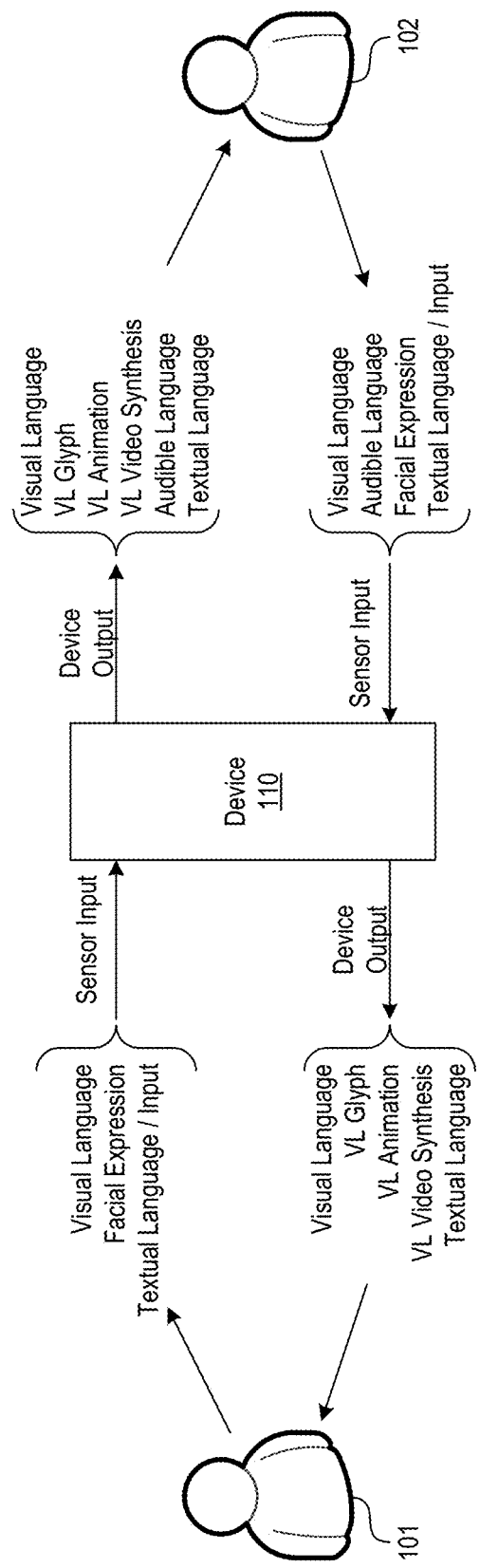
FIG. 1 illustrates a two-way translation system used by two parties in accordance with an example embodiment of the disclosed technology.

Pattern recognition is the automated recognition of patterns and regularities in data. Gesture recognition focuses on a specific type of pattern: gestures, which can originate from any bodily motion or state. Pattern and gesture recognitions are closely related to artificial intelligence and machine learning. In machine learning, pattern and gesture recognition is accomplished by assigning labels to images, or more generally, to inputs, which allows the input to be recognized through the use of artificial intelligence systems. In many cases, pattern and gesture recognition systems are trained from labeled training data using one or more training methods. Among the many algorithms that can be implemented to perform the training, such as decision trees, Bayesian classifiers, and linear/quadratic discriminant analysis, the use of neural networks is gaining an increasing amount of attention in the field of artificial intelligence. A neural network, in the case of machine learning, is an interconnected group of artificial neurons that uses a mathematical or computational model for information processing based on connectionism.

One specific application of using the neural networks for pattern and gesture recognition is sign language translation. Sign languages are extremely complex. In general, sign languages do not have any linguistic relation to the spoken languages of the lands in which they arise. The correlation between sign and spoken languages is complex and varies depending on the country more than the spoken language. For example, the US, Canada, UK, Australia and New Zealand all have English as their dominant language, but American Sign Language (ASL), used in the US and English-speaking Canada, is derived from French Sign Language whereas the other three countries sign dialects of British, Australian, and New Zealand Sign Language (collectively referred to as BANZSL). Similarly, the sign languages of Spain and Mexico are very different, despite Spanish being the national language in each country.

Furthermore, unlike spoken languages, in which grammar is expressed through sound-based signifiers for tense, aspect, mood, and syntax, sign languages use hand movements, sign order, and body and facial cues to create grammar. In some cases, even certain uttered sounds or clicks may form a part of the sign language. Such a cue is referred to as a non-manual activity and can vary significantly across different sign languages. It is desirable for a sign-language translation system to capture and process both the hand movements and the non-manual activities to provide an accurate and natural translation for the parties.

Embodiments of the disclosed technology that are implemented for sign language translation are flexible and adaptable in that an input sign language, which can be any one of a several sign languages, is converted to an internal representation, which can then be used to translate the input sign language into one or more of a variety of output sign languages. Furthermore, the embodiments described in this document employ a multiplicity of different sensors and processing mechanisms to be able to capture and process information that may not be obtainable when a single sensor or process is utilized, and to facilitate accurate capture, processing and interpretation of the information to allow translation between different sign languages. In an example, the Bible may be translated from any language to a particular sign language, or from one sign language representation to another, based on the embodiments disclosed in this document. In general, any textual, audible or sign language content may be translated in real-time to corresponding content in another audible, textual or sign language.

FIGS. 1-10 are illustrations offered to provide the proper context for the specific application of a sign language translation system that can benefit from the training techniques described in later sections of this document. FIG. 1 illustrates a two-way translation system used by two parties in accordance with an example embodiment of the disclosed technology. As shown in FIG. 1, a device 110 facilitates communication between a first party 101 and a second party 102. The device 110 comprises two sets of sensor inputs and outputs for each of the users. In an example, an outgoing communication of the first party (who may be a sign language user) may be a visual language, a facial expression, or a textual language or input. The device 110 identifies the language used by the first party and translates it into a language understandable by the second party, and outputs it based on a preference of the second party. In another example, as a part of the incoming communication, the device may provide the translated output as a visual language (e.g. another sign language) that may include glyphs, animations or video synthesis (e.g. avatars), or in an audible or textual language.

This process can be inverted by the device in that an outgoing communication of the second party, which now may also be in an audible language, is identified and translated for the first party. The device may output the translation as an incoming communication for the party as a type of visual language or a textual language. The device may input the visual language, audible language, facial expression, or textural language or input as an outgoing communication from the party. In some embodiments, the language choice or preference of either party may be identified by the device. In other embodiments, the language choice or preference may be predetermined or selected in real-time. It is noted that the example system of FIG. 1 allows communications between two sign language users, or a sign language user and a non-sign language user.

Figure 2:
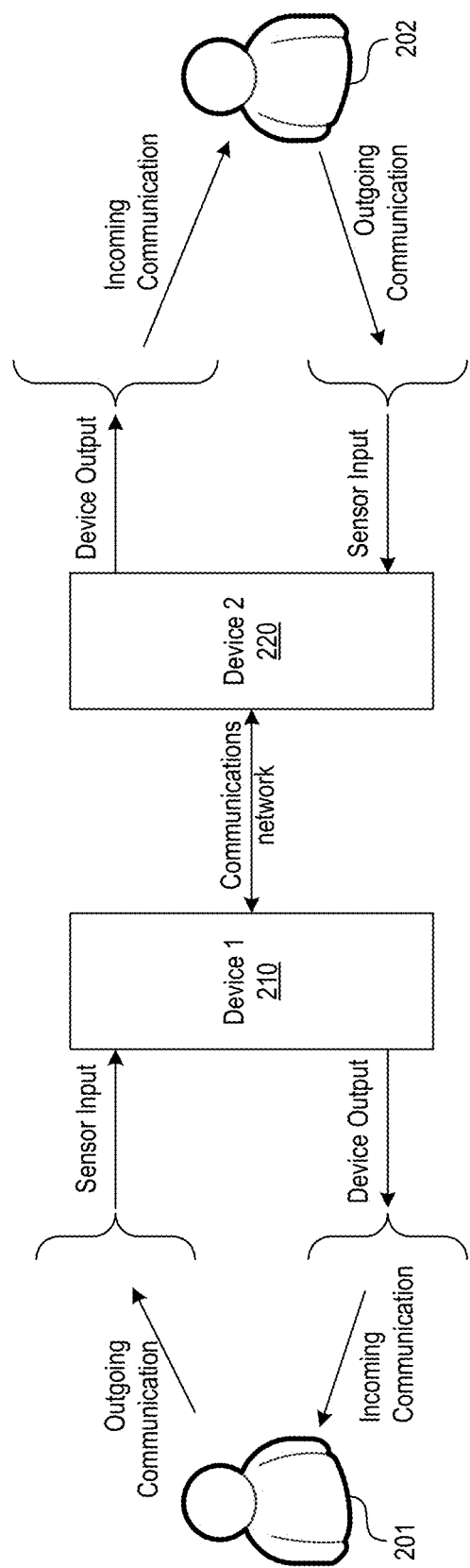
FIG. 2 illustrates a remote two-way translation system used by two parties that may be in different locations over a communication network in accordance with an example embodiment of the disclosed technology.

FIG. 2 illustrates a remote two-way translation system used by two parties that may be in different locations over a communication network in accordance with an example embodiment of the disclosed technology. As shown in FIG. 2, the first party 201 and a second party 202 need not necessarily be co-located as long as they have access to a communication network that allows the exchange of information from one location to another location. In the depicted scenario, two devices 210 and 220 are connected via a communication network, which can be a wired network or a wireless network such as a Wi-Fi network, a personal area network, or a mobile network. As in the case of FIG. 1, the remote two-way translation system allows communications between two sign language users, or a sign language user and a non-sign language user.

Figure 3:
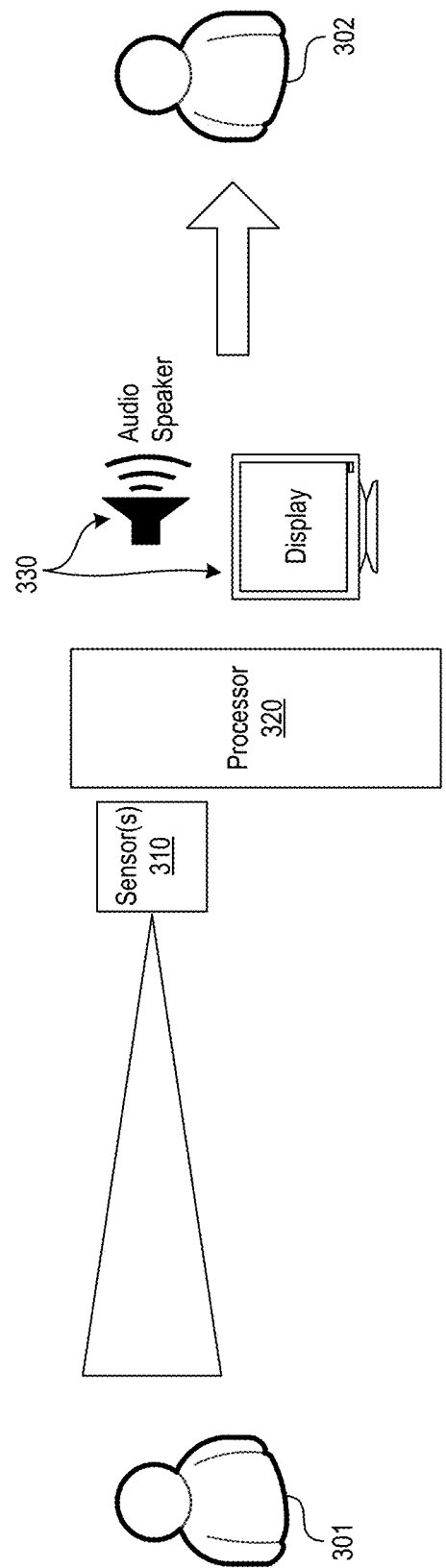
FIG. 3 illustrates a one-way translation system used by two parties in accordance with an example embodiment of the disclosed technology.

FIG. 3 illustrates a one-way translation system used by two parties 301, 302 in accordance with an example embodiment of the disclosed technology. This example includes some features and/or components that are similar to those shown in FIGS. 1-2, and described above, and their description is not repeated. As shown in FIG. 3, one or more sensors 310 capture one or more aspects of the sign language speaker and/or the speaker's environment and generate a digital representation of what is being observed. As will be described in later sections of this document, the one or more sensors 310 can include a variety of audio, video, motion, haptic and other types of sensors. In some embodiments, the video rate of the sensor data capture may be selected based on the sign language input due to the increased complexity of some sign languages. The digital representation of the sign language communication may include one or more gestures, facial cues, body cues, or environmental factors.

The captured information, including the captured video, is then processed by one or more processors 320 to identify the input sign language, recognize individual gestures and other features of the communication, and translate the communication to an internal representation. The internal representation of the sign language communication can then be converted to an appropriate language and/or format and displayed or audibly output in the language of the second party by various output devices 330, such as displays, speakers, and haptic devices. In some embodiments, the second language may be either a predetermined language or selected by the second party. In other embodiments, a second translation or transformation may be performed if it is detected that certain output devices are not present, or if the user selects an alternate output option.

Figure 4:
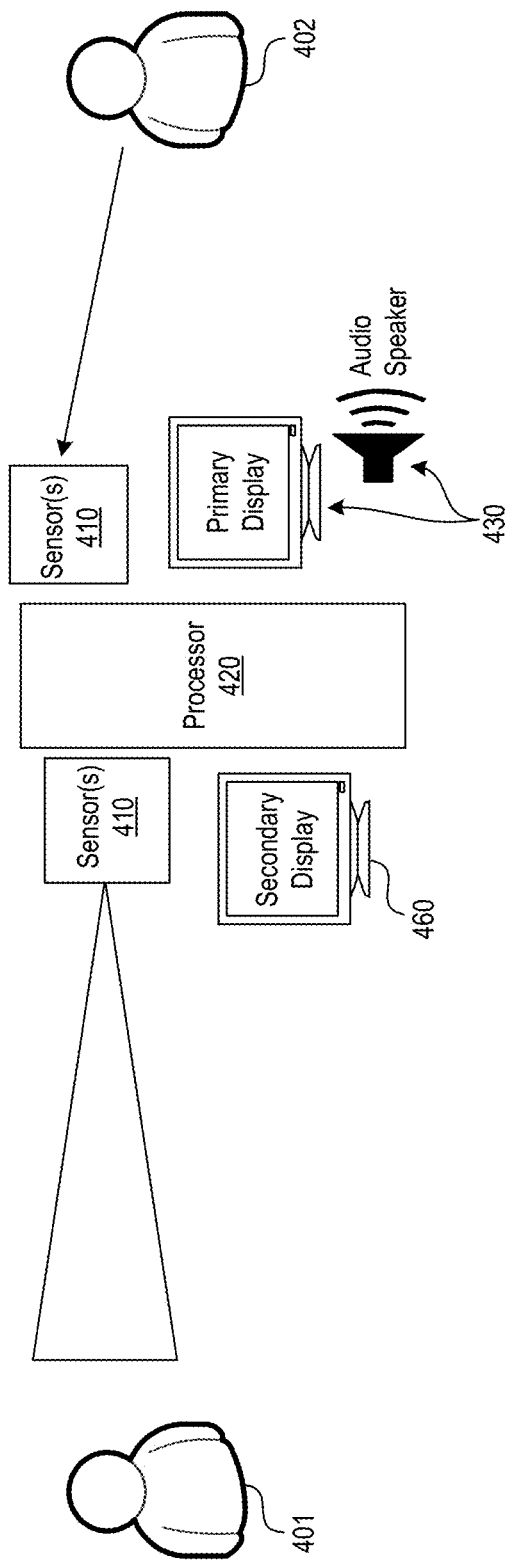
FIG. 4 illustrates another two-way interactive translation system implemented to enable communications by two parties in accordance with an example embodiment of the disclosed technology.

FIG. 4 illustrates another two-way interactive translation system implemented to enable communications by two parties 401, 402 in accordance with an example embodiment of the disclosed technology. As shown in FIG. 4, the translation system includes one or more sensors 410, one or more processors 420, and various output devices 430 that are similar to the components described above, and their description is not repeated. In FIG. 4, the one or more sensors 410 are able to receive audible or physical input from the second party 402, who wishes to communicate with the sign language speaker (the first party 401). In some embodiments, the translation system includes additional input interfaces, such as a keyboard or a touchscreen, to receive physical input from the second party 402.

The audible or textual input from the second part is processed by the processor and converted to the internal representation. This internal representation of the second party's communication is then translated to the sign language of the first party 401 and displayed via a secondary display 460. In some embodiments, the first party may receive the input as text, graphic (glyph-like) or through an animated figure representation of the second party. In other embodiments, the two-way translation between a sign language and a textual, audible or different sign language may be performed in real-time.

Figure 5:
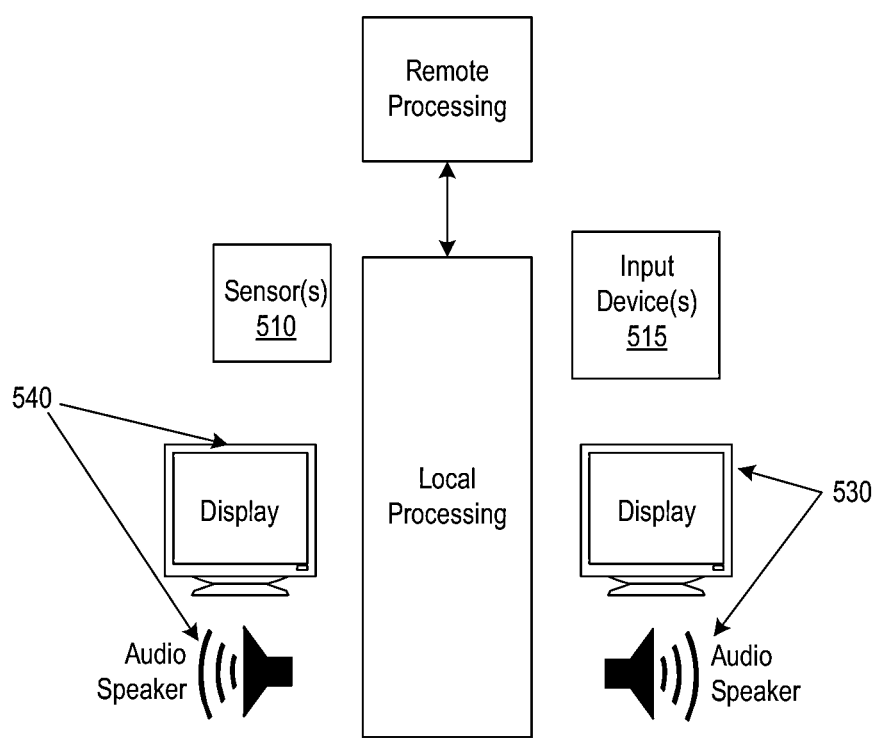
FIG. 5 illustrates a configurable automated translation system in accordance with an example embodiment of the disclosed technology.

FIG. 5 illustrates a configurable automated translation system in accordance with an example embodiment of the disclosed technology. As shown in FIG. 5, embodiments of the disclosed technology may include a number of different visual language sensors 510. In an example, the visual language sensors may include one or more of an RGB color camera, a monochrome camera, a 3D stereo camera, structured light emitter, a 3D processor of structured light, a time-of-flight emitter and camera, a non-visual electromagnetic sensor and a non-visual electro-optical sensor. The system may also include standard input devices 515, e.g. a microphone, a microphone array or 3D microphone, a touchscreen keyboard, or a physical keyboard.

In addition to the input sensors described above, the device includes a host of output capabilities. For example, standard language rendering may be performed using a textual display or a speaker 530. On the other hand, the sign language output may include textual, graphical (glyphs, etc.), animated (virtual hands, avatars, etc.) or synthesized video (from a library of basic visual language gestures) outputs, which can be demonstrated to the user via another textual display or speaker 540.

FIG. 5 also illustrates that the processing of the input language from the first party, and specifically the translation from an input language to the internal representation and subsequently to the language of the second party, can be performed either locally, remotely or both. In some embodiments, the device may have access to cloud computing resources, which may be leveraged in, for example, configurations where many different output sign languages are to be supported.

Figure 6:
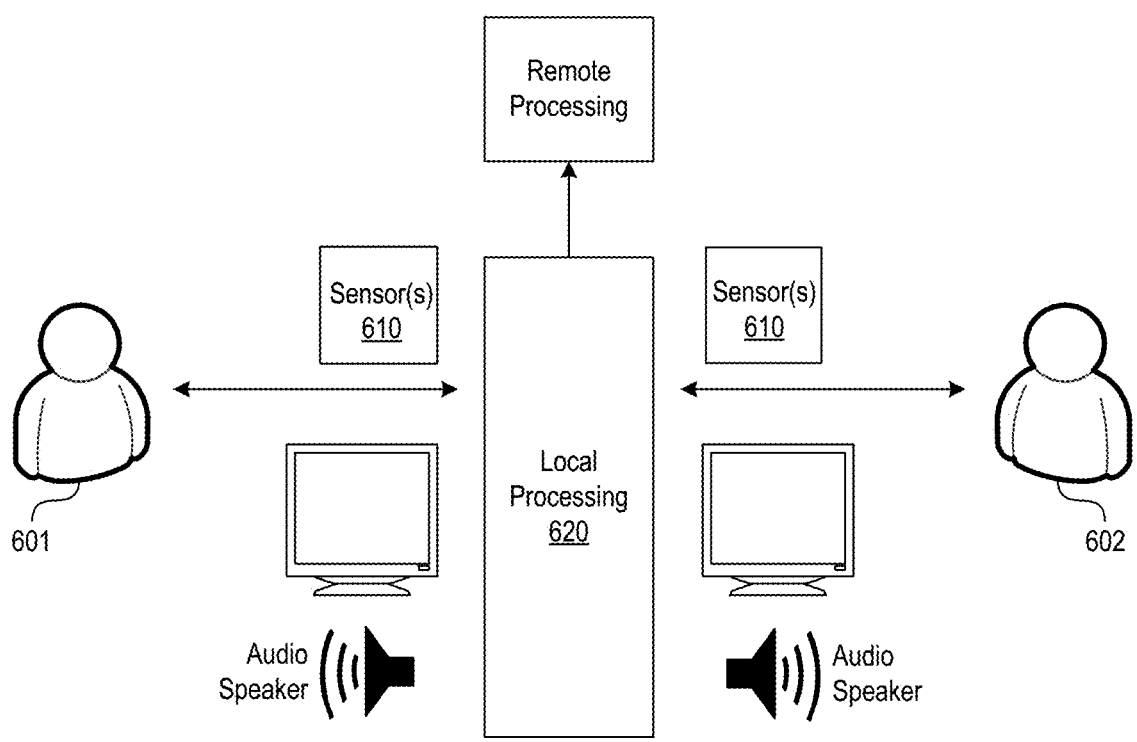
FIG. 6 illustrates another configurable automated translation system in accordance with an example embodiment of the disclosed technology.

FIG. 6 illustrates another configurable automated translation system in accordance with an example embodiment of the disclosed technology. As shown in FIG. 6, the translation system includes one or more sensors 610, one or more processors 620, and various output devices that are similar to the components described in the examples above, and the corresponding description is not repeated. In some embodiments, the first party 601 or the second party 602 is not necessarily a person but could be automata. For example, a sign language user may communicate with a virtual assistant, an interactive response agent, or simply an alert generation mechanism. Embodiments of the disclosed technology are flexible and adaptable to be able to support the translation of languages between sign language users, audible language speakers, and automata, and any combination of the above. In part, this is achieved by translating the input language to an internal representation, and then translating it to the required one or more output languages.

In an example, the Bible may be translated into American Sign Language (ASL) which is one of the most commonly used sign languages. Expert input, e.g. interpretation and context for specific verses or sections, may be used to improve the translation during the training period. The ASL-translated Bible may be then displayed using an avatar in a less commonly used sign language that is not ASL. In some embodiments, both the first and second parties may be sign language users, and furthermore, may not use the same sign language.

Figure 7:
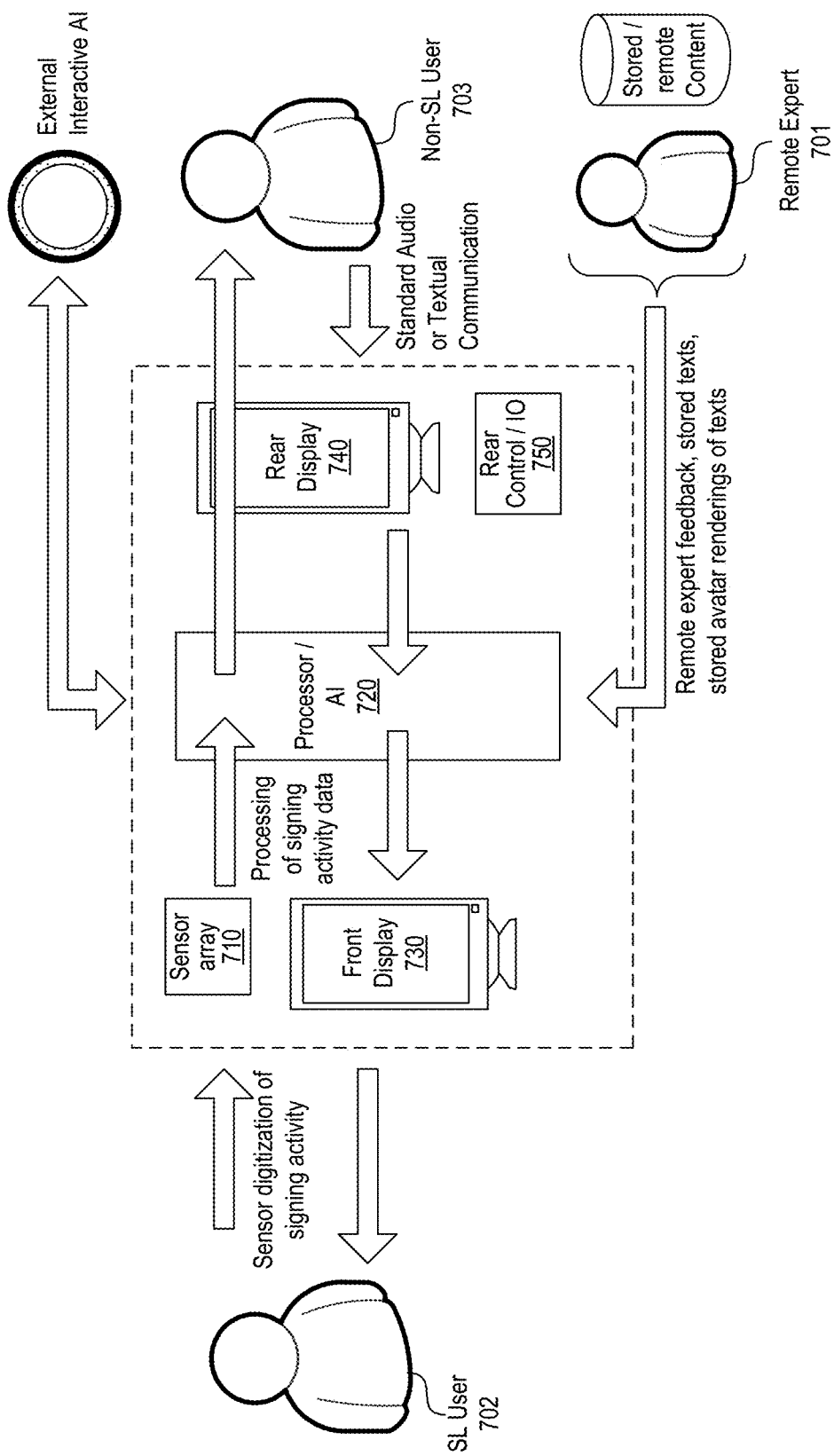
FIG. 7 illustrates yet another configurable automated translation system in accordance with an example embodiment of the disclosed technology.

FIG. 7 illustrates yet another configurable automated translation system in accordance with an example embodiment of the disclosed technology. The automated sign language translation system can be used to translate specific literature or material, e.g. the Bible or works by a particular author. In these scenarios, a remote expert 701 may provide additional context and insight as part of the automated translation process. For example, idiomatic and situational context related to specific content may be used in the training of the neural network and may result in a more natural and useful translation into one of many sign languages.

FIG. 7 illustrates, in part, the digitization of signing activity that is received using a number of sensors 710 that can sense signing activities of a user who uses sign language(s) (also referred to as an SL user 702). The captured data is then fed to one or more processors 720 for processing. Due to the complexity of sign language, and in an effort to support many sign languages, the amount of data that is captured may be prohibitive. Thus, embodiments of the disclosed technology may leverage data that has previously been captured and digitized to reduce the amount of data that needs to be stored when the device is being used in real-time, either locally or in a remote setting. The device then outputs textual or avatar rendering of communication or content to the SL user via the front display 730 of the device.

The device can also include a rear display 740 to show textual or audio communication or content to a user that does not use sign languages (also referred to as a non-SL user 703). The device can receive standard audio or textual communication from the non-SL user and may include a rear control 750 for the non-SL user 703 to control the device.

In some embodiments, the device may be effectively used to perform sign language translations in a remote region, where access to studios and/or more sophisticated computer technology is non-existent or very limited. In an example, a basic corpus of a sign language that is used in a remote area may be used to initially train the neural network and will allow translations upon arrival to that region. After the system is deployed there, the corpus may be expanded exponentially based on input by native sign language users, which will improve the translation capabilities due to iterative training and interpretation (or execution) cycles of the neural network.

Figure 8A:
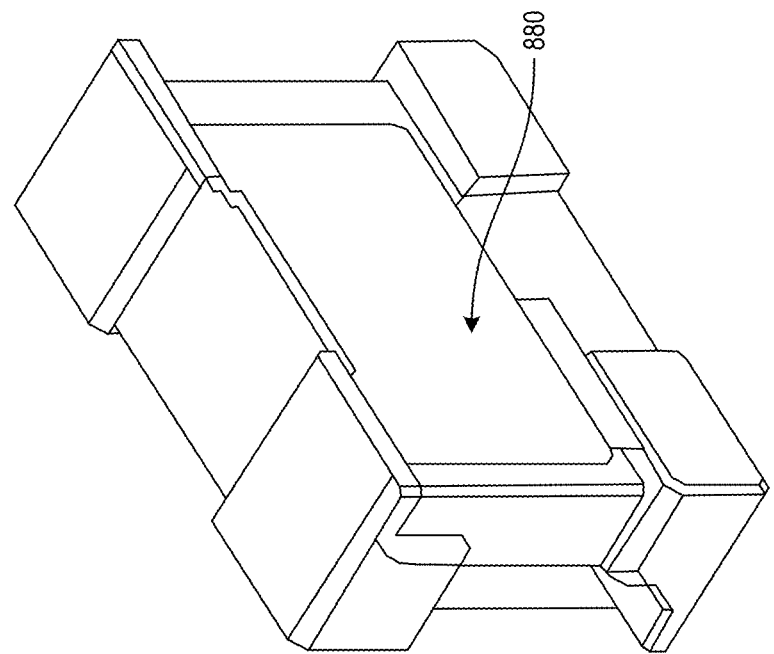
FIG. 8A illustrates one view of an image capture and processing device that can be used for automated sign language translation in accordance with an example embodiment of the disclosed technology.
Figure 8B:
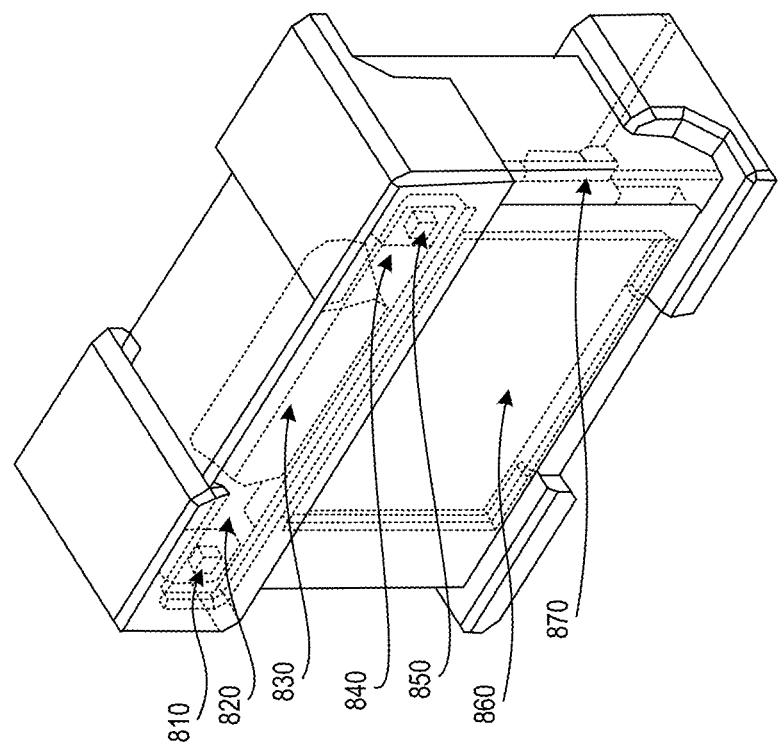
FIG. 8B shows another view of an image capture and processing device that can be used for automated sign language translation in accordance with an example embodiment of the disclosed technology.

FIGS. 8A and 8B illustrate different views of an image capture and processing device that can be used for automated sign language translation in accordance with an example embodiment of the disclosed technology. As shown in FIG. 8A, the image capture and processing device may include a right camera 810 and a left camera 850 to be able to capture a moving object or scene (e.g., a sign language speaker) from different points of view, therein increasing the depth of field measurements that enable more accurate interpretation of the scene such as the sign language gestures. Similarly, the inclusion of a right microphone 820 and a left microphone 840 enable different contextual and environmental cues to be captured.

The image capture and processing device further comprises stereo (or 3D) camera 830, a front display 860, and one or more processors 870. In some embodiments, the one or more processors include an ARM Cortext-M3 processor and at least one graphics processing unit (GPU). In other embodiments, and as shown in FIG. 8B, the device may further comprise a rear display 880, which may be a touchscreen display. In some embodiments, the stereo camera 830 may be replaced or augmented by a depth sensor or multi-aperture camera, which may be configured to measure the "depth" or distance from the camera focal baseline to the object corresponding to a particular pixel in the scene.

Figure 9:
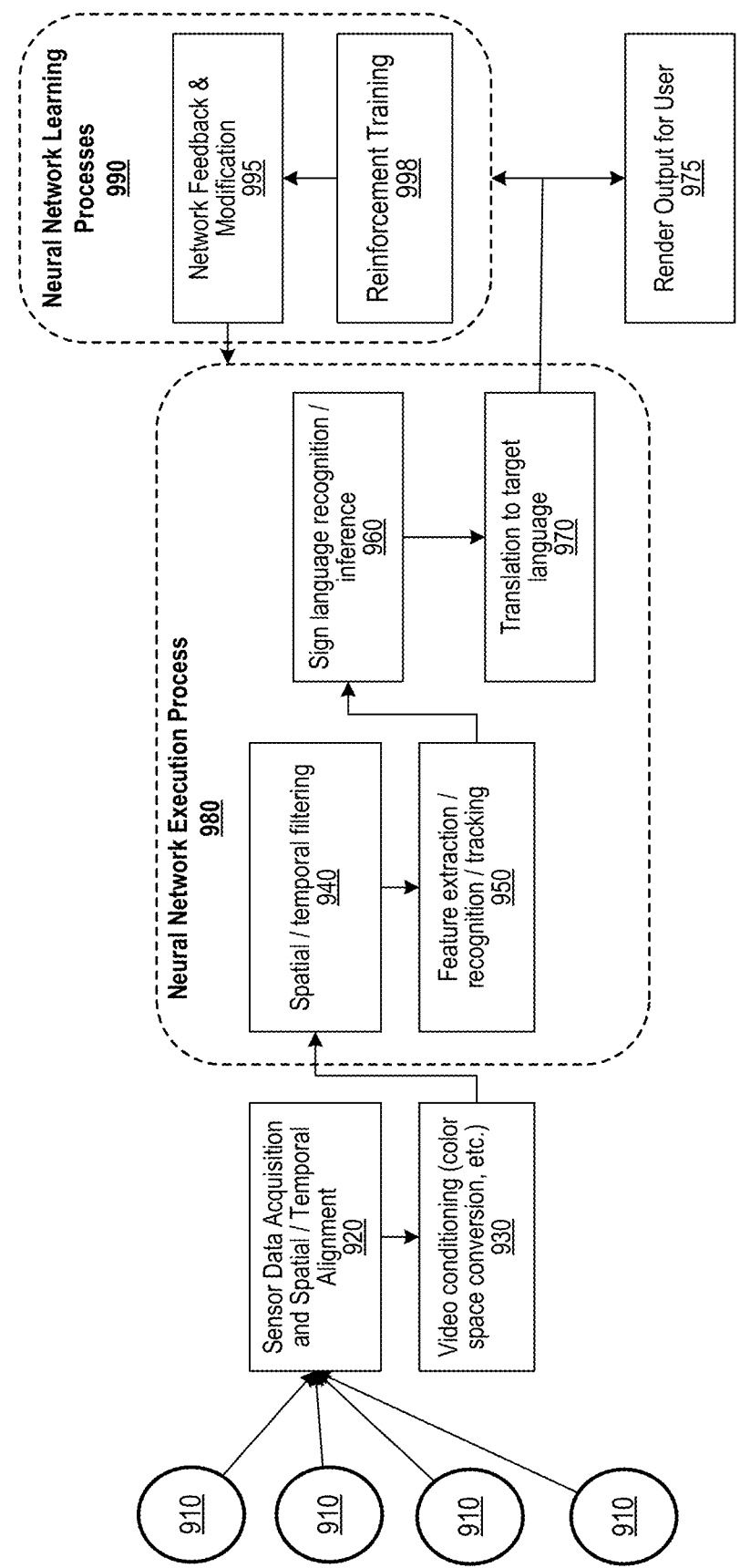
FIG. 9 illustrates a flow diagram of operations that can be carried out by various component to implement automated sign language translation in accordance with an example embodiment of the disclosed technology.

FIG. 9 shows an example flow diagram of operations that can be carried out by various component to implement automated sign language translation in accordance with one or more embodiments of the disclosed technology. This example includes some features and components that are similar to those described above, and their description is not repeated.

As shown in FIG. 9, multiple sensors 910 may each capture a communication of a sign language user. In an example, using multiple sensors enables environmental factors to be acquired, and provides better depth of field measurements of sign language gestures. In some exemplary operations, a set of preprocessing operations can be performed. For example, the input data collected from the multiple sensors is first aligned, in operation 920, both spatially and temporally. For example, based on the video quality and the external lighting and other conditions, video conditioning procedures 930 (e.g. color space conversion) may be implemented. This operation may be followed, for example, by spatial and temporal filtering in operation 940, to reduce the data to a particular resolution, retain data for only a particular spatial zone of interest or a temporal period of interest. The processing may further include the application of image and/or video processing methods, e.g. edge detection, which conditions the data for additional processing.

The conditioned data of the communication from the sign language user can then be processed in operation 950 in order to extract features of gestures, facial cues and body cues, amongst other features that enable the identification of the sign language. The input sign language is translated to an internal representation in operation 960, and subsequently translated to the target language in operation 970. The output is then rendered to the user at operation 975.

In some embodiments, the feature extraction, identification and translation may be part of a neural network execution process 980. Before the neural network starts the execution process, the neural network is trained by the neural network learning process 990. The techniques discussed in later sections of this document can be implemented in the neural network learning process to allow the trained neural network to recognize a large number of characteristics in the input data more efficiency and more accurately. To perform the neural network learning process, a set of training data can be used to carry out training algorithms such as supervised training of the neural network. In some embodiments, as part of feedback for the learning process, the translated sign language is used to further train and modify the neural network, in operation 995, to improve its identification and translation capabilities. In yet other embodiments, reinforcement training 998 of neural networks may be employed to improve performance and increase the flexibility and adaptability of embodiments of the disclosed technology.

Figure 10:
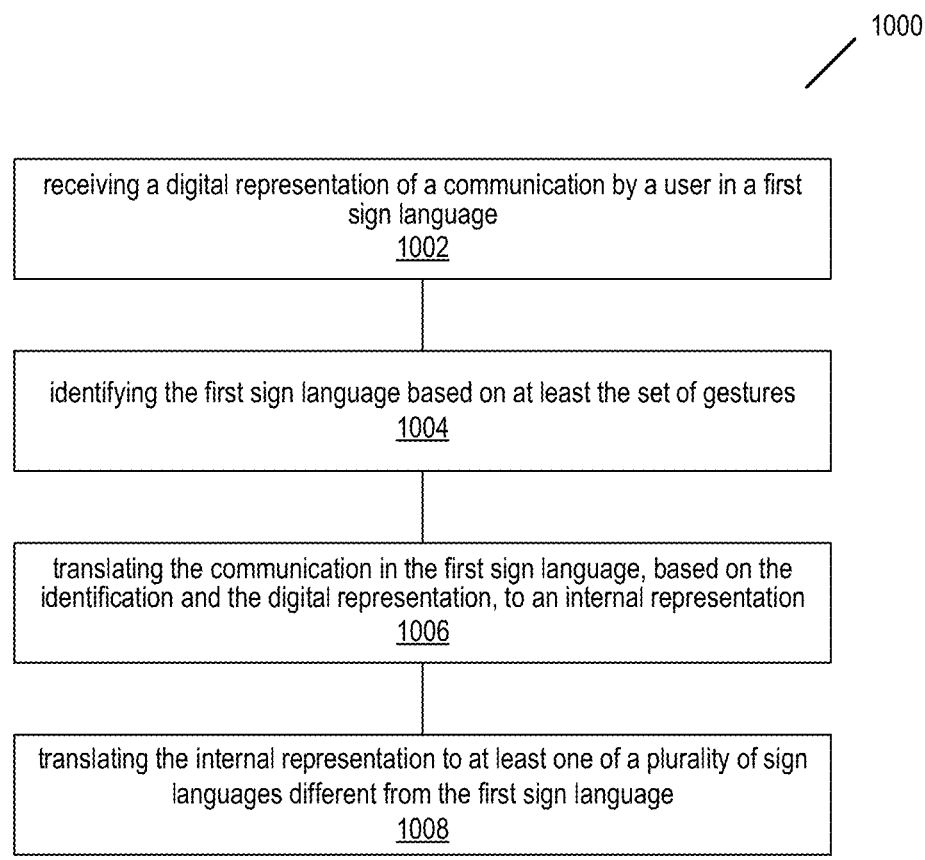
FIG. 10 illustrates a method that includes a set of operations that can be carried out to automate sign language translation in accordance with an example embodiment of the disclosed technology.

FIG. 10 illustrates a method 1000 that includes a set of operations that can be carried out to automate sign language translation in accordance with an example embodiment of the disclosed technology. The method 1000 includes, at operation 1002, receiving a digital representation of a communication by a user in a first sign language. In some embodiments, the digital representation includes a plurality of images. In other embodiments, the digital representation includes a video recording.

The method 1000 includes, at operation 1004, identifying the first sign language based on at least the set of gestures. In some embodiments, identifying the first sign language may be based on a sign language gesture library or sign language content curated by an expert. In an example, the expert content may comprise idiomatic and situational context associated with the first sign language.

The method 1000 includes, at operation 1006, translating the communication in the first sign language, based on the identification and the digital representation, to an internal representation. The method 1000 includes, at step 1008, translating the internal representation to at least one of a plurality of sign languages different from the first sign language. In some embodiments, the translation may be based on sign language content curated by an expert. For example, and when translating known subject matter (e.g. the Bible) the expert content may be based on existing interpretation and analysis.

In some embodiments, the method may further include receiving a response to the communication, which is translated into the internal representation, and subsequently into the first sign language. Embodiments of the disclosed technology are capable of real-time operation, which is enabled, in part, by the internal representation and the underlying neural network.

As noted earlier, the example configurations in FIGS. 1-10 represent examples of systems that capture a variety of information (e.g., video, audio, still images, etc.) in different modalities (e.g., natural light, structured light, infrared light) of moving and still objects, as well as of the background environment. As a result, a large amount of data is obtained to undergo further processing and analysis to extract the information of interest. Generation and analysis of large amounts of data are hallmarks of other systems and applications, such as autonomous vehicles and medical applications that involve analysis of medical images (e.g., MRI, X-ray, CT scan, video content, etc.). Additional applications include, but are not limited to, interactive video games, airport security and surveillance applications, analysis and training for various sports, interactive home devices, and others.

In the above applications, including translations between different sign languages, the processing capabilities of the described embodiments include the ability to observe and leverage what has been learnt from each party in order to provide a desired outcome or result, such as providing a more natural translation of the communication between the two parties. As discussed above, the processing and analysis of the information, such as processing and interaction between the parties in a sign language translation application, can be implemented using a learning process as part of an artificial intelligence (AI) system such as a neural network system, to improve the accuracy and the performance of analysis.

Referring back to FIG. 9, the neural network engine can operate in two modes: training mode (e.g., the neural network learning process) and interpretation mode (e.g., the neural network execution process). In the training mode, the neural network, which forms a part of the artificial intelligence (AI) core, receives known inputs and associated meanings and other information. In the interpretation mode, the neural network engine attempts to identify and interpret the input data that is collected by, for example, the disclosed interactive sign language system, which also forms part of the learning process. The modes of operation can be selectively enabled or disabled to allow the system to be configured for one or the other mode of operation.

In some embodiments, the training and interpretation of the neural network may use supervised learning, unsupervised learning, or reinforcement learning techniques at various stages depending on the data available and the particular learning task being optimized. These learning paradigms can be augmented by content by additional information, such as information from sign language experts in sign language translation application, which provides situational context and results in a more natural translation.

In the sections that follow, examples from the sign language translation system are used to further illustrate the disclosed enhancements in training and utilization of neural networks associated with an AI system. Training of the translation system can face several challenges. Typically, a large set of training data (e.g., training images) is needed to allow the system to accurately recognize the target image of interest from subsequently collected data, and to, for example, provide accurate translations for a sign language. It is also desirable for the training data to have a certain degree of variance to reduce translation errors. For example, to allow the system to accurately recognize the hand movement that represents the word "apple" in the ASL, a data set of 150 to 300 images in different angles of view are typically needed. Obtaining the data set can be a time-consuming task. Furthermore, it can be very difficult to obtain a good set of training data for low resolution sign languages that are not widely used, and thus no readily available data can be obtained. Currently, there is a major lack of video clip or image libraries to furnish a variety of different data covering distances, angles, and other characteristics required to have good training media that will result in high accuracy recognition results. Even if a person locates or takes enough videos, the content across many of the clips overlap, and thus does not add extra value, In the training mode, the neural network engine also needs the associated meanings for the training data. Currently, the training data is labeled manually by a system operator or an expert to identity the features of interest in a training image, such as a person's finger, hand, and/or face. The labeling process, however, can be extremely time-consuming. Referring back to the example of an "apple" in the ASL, after obtaining a training data set of 150 to 300 images, the system operator or the expert must manually label the gesture for an apple, i.e., placing the knuckle of the right index finger against the cheek in all images, which is extremely time consuming. The task of manual labeling may become more cumbersome, or even impossible, when irregularly-shaped features must be labeled. For example, the system operator may create a circular label for the knuckle of the right index finger. Because the knuckle has a non-circular shape, the labeled area includes noise or unwanted features, which lower the training efficiency and impact the execution accuracy of the trained translation system.

Figure 11:
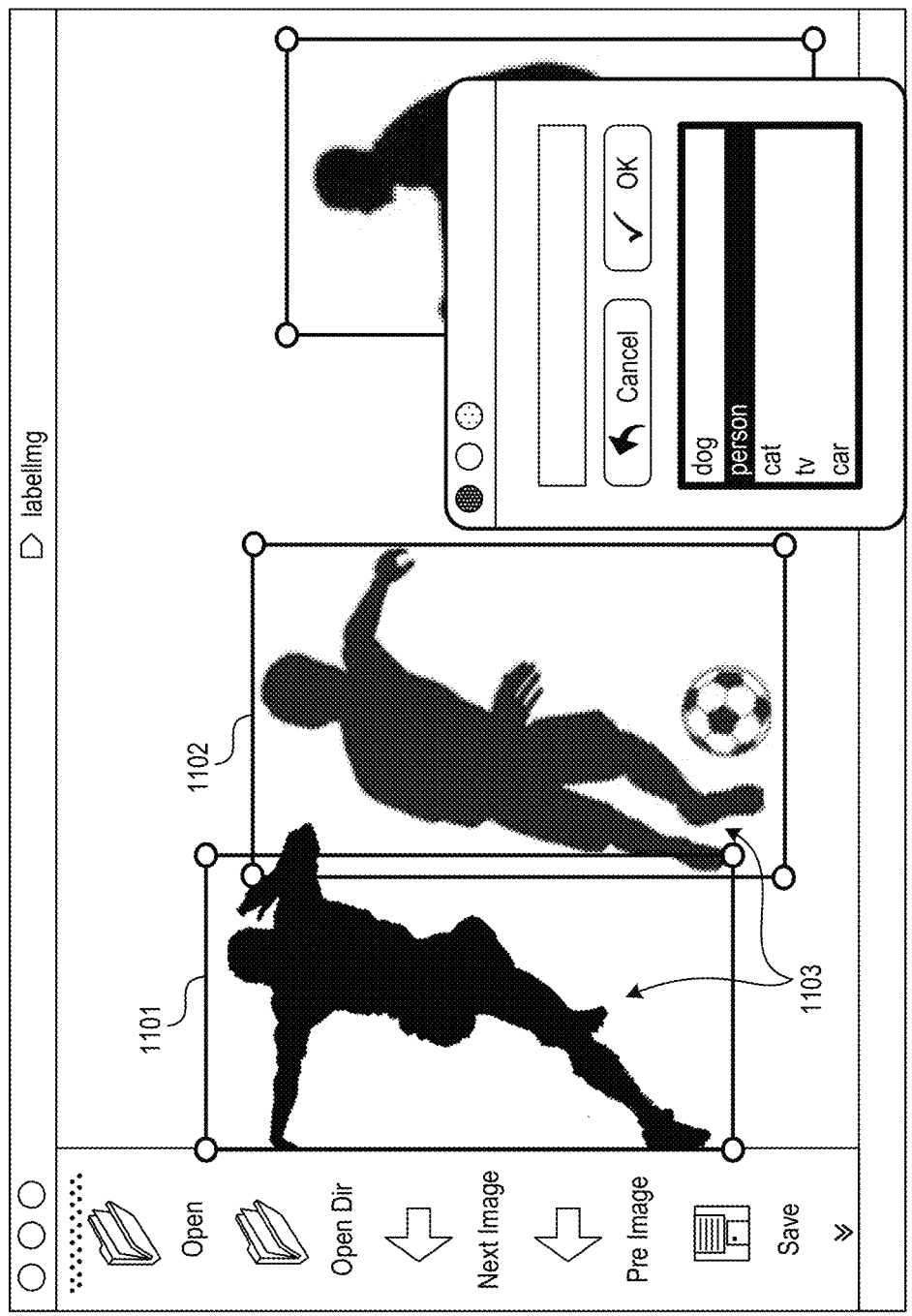
FIG. 11 illustrates an amount of noise and/or unwanted features that can be introduced using regular-shaped labels in pattern recognition.

FIG. 11 illustrates an amount of noise and/or unwanted features that can be introduced using regular-shaped labels in pattern recognition. In FIG. 11, a system operator labels each person with a rectangular label. Each rectangular label 701, 702 for a person includes a large amount of background pixels 703 (e.g., grass on the playing field), which are considered noise and can negatively impact the training efficiency of the system.

Figure 12:
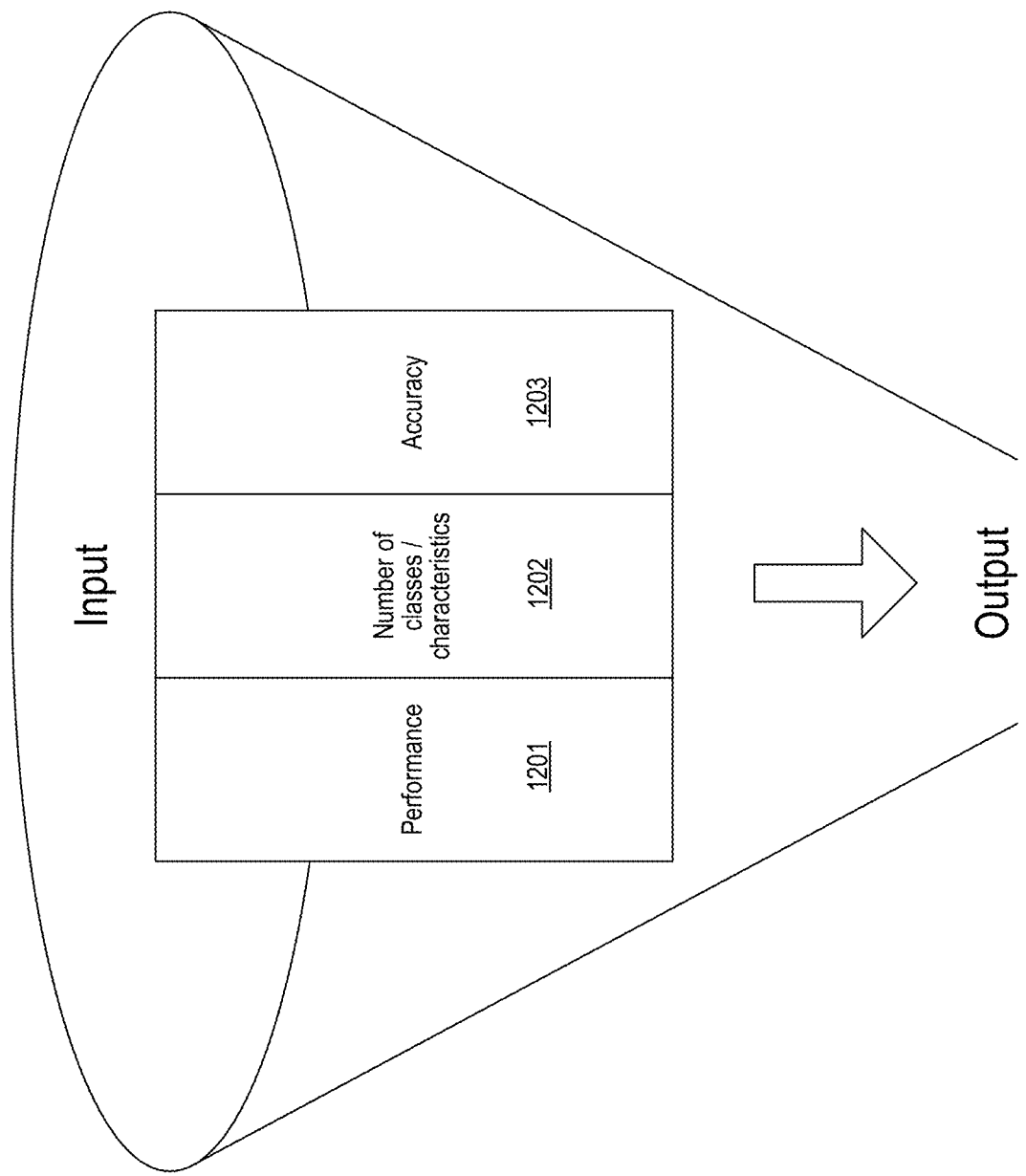
FIG. 12 illustrates three aspects that optimization can be performed to improve pattern and gesture recognition systems in accordance with an example embodiment of the disclosed technology.

The disclosed techniques that are described in the following sections can be used in various embodiments to efficiently train a neural network of an AI system, such as a sign-language translation system, to facilitate identification, understanding and translation of one or more features of interest using a small set of training data. The disclosed techniques can be implemented in various embodiments to significantly surpass the efficiency and capabilities of the existing training processes. As illustrated in FIG. 12, the disclosed optimization techniques can be applied to one or all of the following aspects to improve the training of a pattern and gesture recognition system: performance 1201 (e.g., the execution time of a recognition event), the number of classes/characteristics 1202 (e.g., the number of different images, or regions of an image, that can be recognized), and accuracy 1203 (e.g., the percentage that a recognition event properly identifies the input pixels).

Section headings below are used only to improve readability and do not limit scope of the disclosed embodiments and techniques in each section to only that section.

Example Synthetic Data Generation

A three-dimensional (3D) model is based on mathematical representations of surfaces of an object in three dimensions. Typically, surfaces of an object in a 3D model are represented as vertices, curves, and/or voxels. One or more 3D models can be placed into a virtual setup, which is sometimes referred to as a 3D scene. A typical 3D scene includes at least a virtual camera, one or more virtual lights, and a scene background so that renderings of the 3D objects in the scene can be generated. A 3D scene can also include parameters (e.g., camera attributes, lighting attributes, and/or animation sequences) to allow different renderings of the 3D model(s) to be created. It is noted that the use of the term camera and light in the context of the 3D model refers to capturing a 3D scene as if it were positioned under a light source and captured from the angle and position of a camera, though no real cameras or light sources were used.

The disclosed embodiments rely at least in-part on 3D models that are placed in a scene to facilitate the generation and selection of a proper set of training data. In particular, 3D models of the human body can be obtained to generate synthetic training data for sign language training, which eliminates the need for manual search of suitable training images. For example, after a 3D model of a human body is obtained from one of the online sources, the model can be positioned in a 3D scene, cither manually, using a motion capture suit, or using a 3D scanning system, to show a gesture that represents a letter, a word, or a phrase in a particular sign language. Using this setup, a reduced set of training images can be obtained from rendered images of the 3D scene. As will be described below, the set of images produced based on the above technique eliminates (or greatly reduces) the need for manual labeling and enables optimization of different aspects of the translation system.

Figure 13:
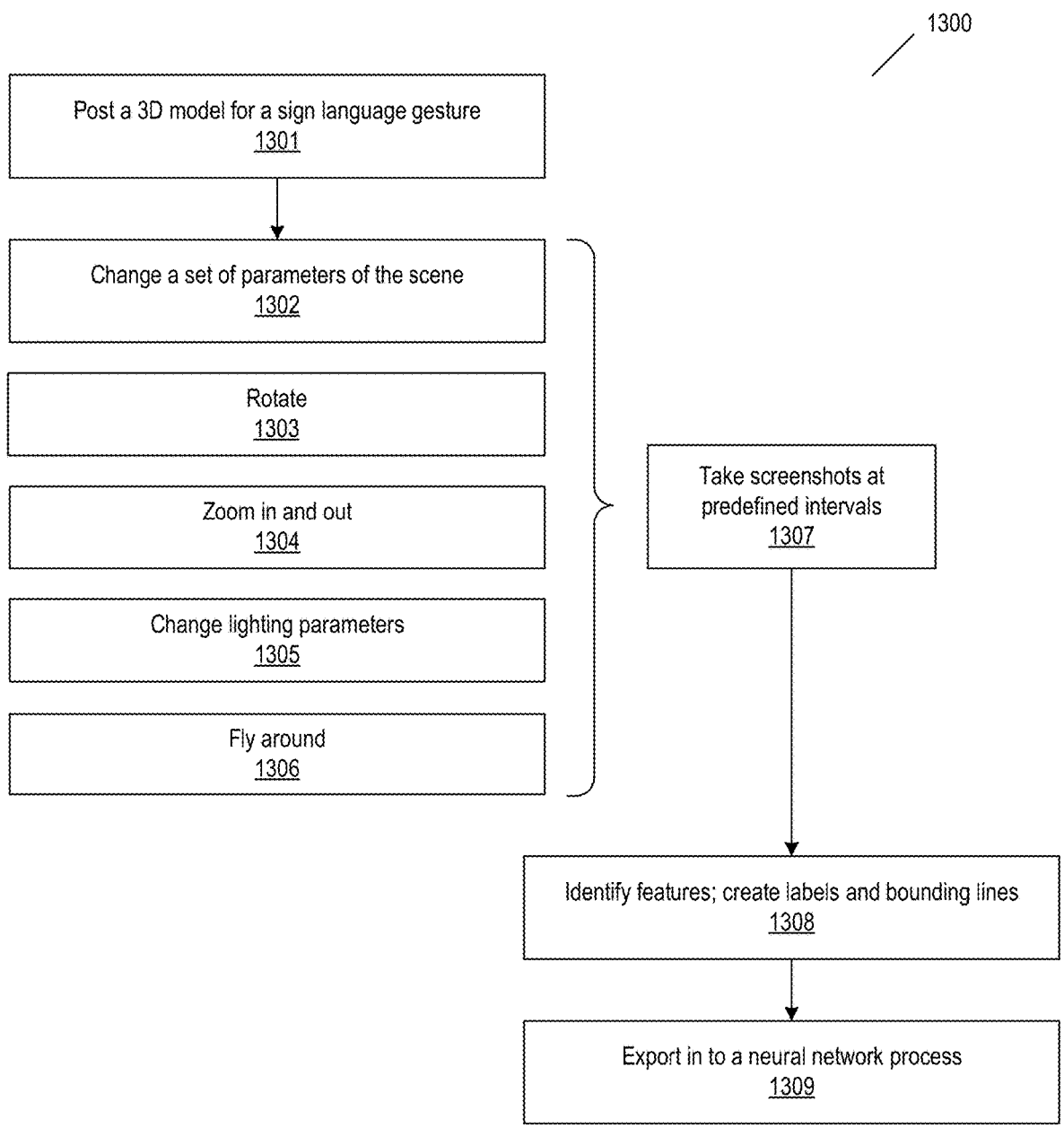
FIG. 13 illustrates representative operations taken by a training system implemented in accordance with an example embodiment the disclosed technology.

FIG. 13 illustrates representative operations taken by a training system implemented in accordance with an example embodiment the disclosed technology. After obtaining a 3D model, the training system may pose or configure, at operation 1301, the 3D model (also known as rigging the 3D model) to show a gesture that corresponds to a letter, a word, or a phrase in a sign language. The rigging process allows parts of the 3D model that are relevant to the gesture to be marked as visible. In some implementations, the 3D model can be displayed via a user interface of the training system on a display device, such as a computer screen or a monitor, and/or projected onto a projection screen.

A gesture can be static or animated. In some embodiments, the system can apply keyframes to the 3D model to show an animated sequence of movements. Here, a keyframe defines the starting and ending points of a smooth transition between the positions. For example, referring back to the example of "apple" in the ASL, a 3D model can be rigged and/or key-framed to show an animated sequence of movements with the right-hand rotating around the knuckle.

Referring to FIG. 13, the training system can change, at operation 1302, a set of parameters of the 3D scene automatically to create different training images. For example, the system can rotate, at operation 1303, the 3D model along one or more axes (e.g., X, Y, and/or Z axes) of the scene. The system can also zoom in and/or out, at operation 1304, to show a bigger and/or smaller view of the 3D model. In some embodiments, the lighting parameters for the model can be changed at operation 1305. For example, the brightness of one or more lights can be changed to show a brighter or darker rendering of the model. The background of the 3D scene can also be changed to mimic real-life scenarios. In some embodiments, the system can also change the color of the skin, the placement of the facial features, and/or the textures of the clothing so that the resulting training images have a large degree of variance. In some embodiments, the system can set up a "fly-around" path, at operation 1306, to produce scenes that are viewed from different angles (e.g., different "camera angles" that simulate movement of a camera with respect to the object). The "fly-around" path allows the camera to capture different views of the object without moving the object itself, thereby avoiding the risk of introducing undesired changes to the relative positions of the components in the model.

The system also generates, at 907, a set of two-dimensional (2D) images of the 3D scene as training images at predetermined intervals. The 2D images can be generated by rendering the 3D scene from the camera's perspective. The rendering may include both photo-realistic rendering and real-time rendering. For example, techniques such as global illumination can be used to generate photo-realistic renderings that show real-life lighting effects. Alternatively, renderings that do not require sophisticated lighting effects can be generated in real-time using a smaller amount of computational power. For static gestures, a training image can be rendered after a change in one or more parameters of the 3D scene. In some embodiments, the system uses the "fly-around" path to generate renderings for different camera positions within a predetermined duration. The camera may have the same or different orientations at different positions. An image can be generated each time the camera updates its position long the path.

In some embodiments, the system imposes a set of displacements (e.g., translations and/or rotations) to the model. An image can be rendered after each translation and/or rotation of the model. For example, an image is rendered after the model is rotated around the Z axis for 36 degrees, resulting in five images in total for a rotation of 180 degrees around the Z axis. The "fly-around" path can also be used together with translations and/or rotations of the model to create a more sophisticated set of training images.

For animated gestures, images can be taken based on the length of the animated sequence, as well as changes of the scene parameters. For example, for each change in a parameter value (e.g., the camera position), several images can be taken to capture the entire sequence of movements that represents "apple" in ASL.

To reduce the training data size while maintaining or even improving the training performance, the system can adopt a set of criteria to obtain desirable parameter changes. In some embodiments, the system can first set a particular value for the total number of images to be captured. The system then generates a "fly-around" path and/or displacements, based on the total number of images, to obtain a suitable amount of variance among the images. For example, the horizontal angles of view of the camera are within a range of 30 to 150 degrees. If the total number of images to be captured is 30, the horizontal angles of view of the camera can be equally distributed within the range (e.g., {34, 38, . . . , 150} degrees) so that the entire range of the angles of view is represented in the images.

In some embodiments, an iterative approach can be used. For example, the system first sets the total number of training images for a model to 30. The system then generates a "fly-around" path that includes five different camera locations in a predetermined time duration. For each of the camera locations, the system generates six rotations for the model so that the model is rotated twice around each of the X, Y, and Z axes. After obtaining the 30 images, the training system is evaluated to determine if it has been properly trained. For example, testing that covers various areas such as performance, accuracy, and/or number of classes/characteristics can be performed as a part of the evaluation. If the training system determines that the trained translation system fails to meet one or more thresholds in one of the areas (e.g., the accuracy of the translation system is lower than a threshold), the training system can revise the "fly-around" path and/or displacements to generate a different set of training images. This process can repeat until the translation system is deemed as adequately trained.

In some embodiments, the system evaluates each of the training images before the full set is finalized. For example, after each image is generated, the system can feed the generated training image to the translation system. The recognition result of the translation system is evaluated to determine how many characteristics the system has recognized, the accuracy of the recognition, and/or the amount of time used for performing the recognition. If any of these criteria (also shown in FIG. 12) deteriorates or shows no improvement for the translation system, the system can discard that training image, generate another training image and repeat the process.

Example Automatic Labeling

To address the problem of manual labeling, the training system can automatically label (e.g., operation 1308 in FIG. 13) one or more features in the model by identifying polygons in the model that represent the features of interest.

By the way of example and not by limitation, a feature can be a subsection of one or both hands, such as a finger or a palm, that can indicate a hand movement. In some embodiments, a feature can also be used to indicate non-manual activities. For example, facial features and/or body postures, such as the shape or a change in the shape of the left eye, the right eye, the left shoulder, or the right check, tilt of the head, can be used to show a particular non-manual activity. Because the 3D model often represents a feature in the form of a group of polygons (e.g., a set of polygons can be grouped together and named as "right finger"), the feature to be labeled can be automatically highlighted with proper bounding lines.

Figure 14B:
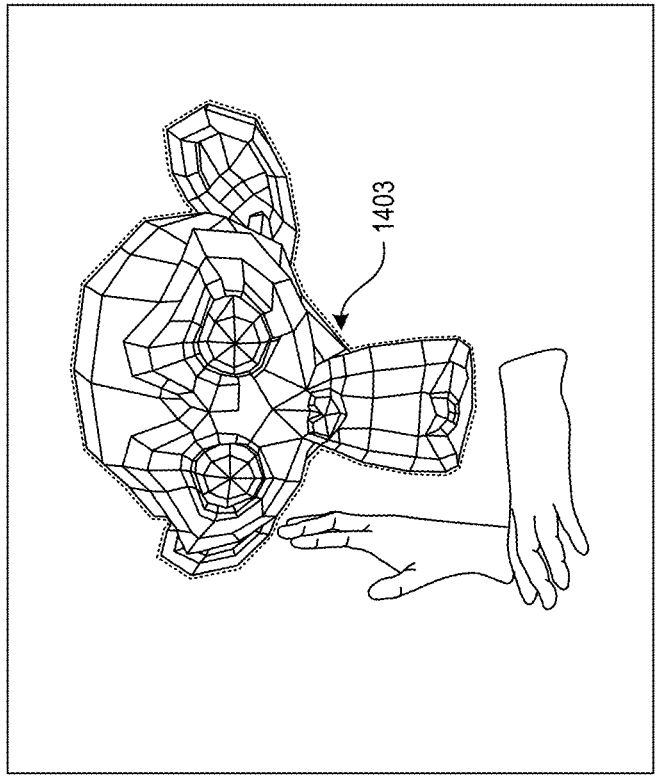
FIG. 14B illustrates another rendering of the monkey head and the two hands in accordance with an example embodiment of the disclosed technology.
Figure 14A:
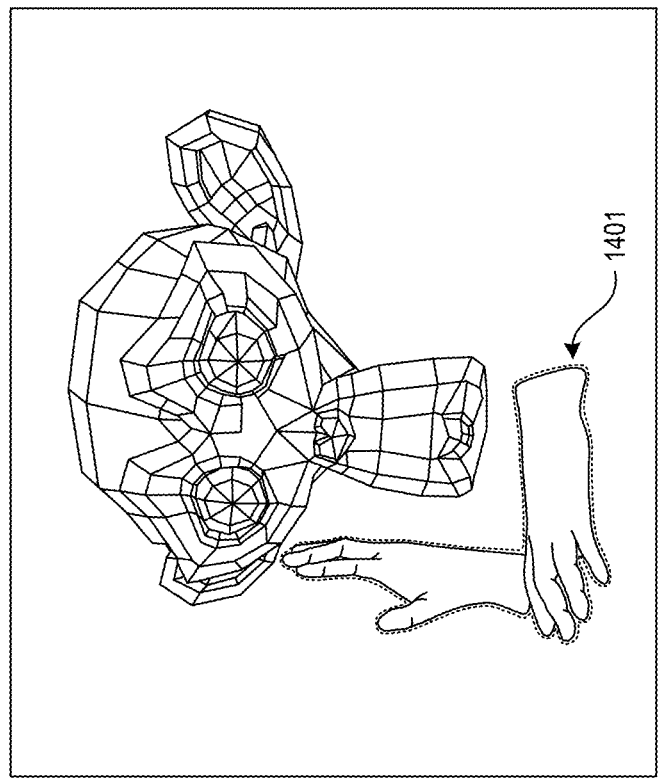
FIG. 14A illustrates a rendering of a monkey head and two hands in accordance with an example embodiment of the disclosed technology.

For example, FIG. 14A shows an example rendering of a monkey head and two hands. The two hands are identified as the feature of interest, so the corresponding image shows highlighted bounding lines 1401 that form the boundaries of the hands. FIG. 14B shows another example rendering of the monkey head and the two hands. In this example, the monkey head is identified as the feature of interest, so the corresponding image shows highlighted bounding lines 1403 that form the boundary of the head. It is thus evident that, as opposed to manual labeling process of images that is either time consuming or can generate lots of noise (e.g., as described in connection with FIG. 11), the disclosed labeling technique takes advantage of the already-known configuration of polygons that form, e.g., the hand, a finger, the head, etc., to quickly and efficiently label the section(s) of interest, as will be further described below.

Figure 14C:
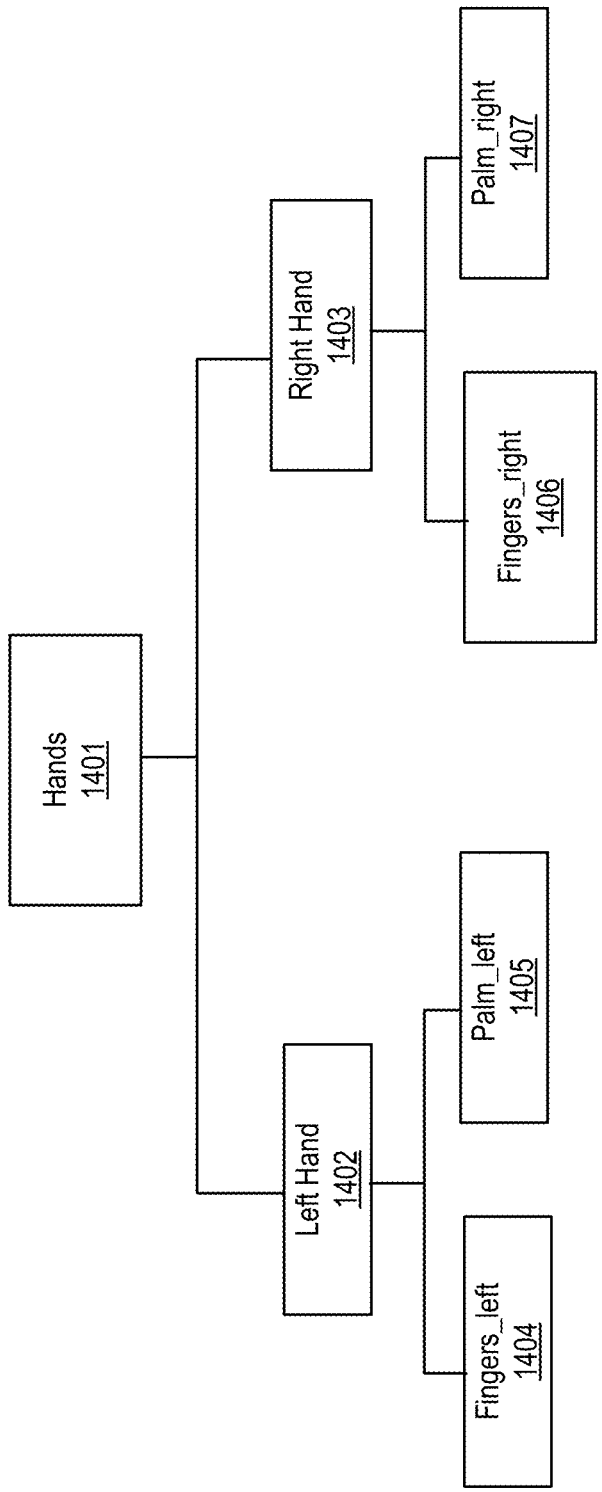
FIG. 14C illustrates an example hierarchy of polygons in a three-dimensional (3D) model in accordance with an example embodiment of the disclosed technology.

Different groups of polygons in the 3D model may be organized in different ways. For example, a 3D model may include a first group of polygons to represent the fingers and a second group of polygons to represent the palm. If the system wants to identify the feature "hand," two groups of polygons can be selected at the same time. The polygons can also be organized hierarchically. For example, as shown in FIG. 14C, a parent group "left hand" 1402, which includes the left fingers 1404 and the left palm 1405, can be created to represent the feature "left hand". Similarly, another parent group "hands" 1401 can be created to represent both features—"right hand" 1403 and "left hand" 1402—at the same time. The "right hand" group can further include the right fingers 1406 and the right palm 1407. To identify both hands, the system can simply select a single group "hands" 1401. In some embodiments, the system may select the group "left hand" 1402 and another group lower in the hierarchy such as "Fingers_right" 1406 for identifying a particular gesture. Regardless of how the polygons are organized, when using the 3D models to generate synthetic training images, manual labeling is no longer required because the selected polygons can provide the precise boundaries of the features of interest.

Referring back to FIG. 13, the training images can then be exported, at 1309, into a neural network engine of the translation system. In some embodiments, the neural network engine may include one or more convolutional neural networks (CNNs) and one or more recurrent neural networks (RNNs), which may be combined in architectures that allow real-time processing for of the training images. A convolutional neural network (CNN or ConvNet) is a class of deep, feedforward artificial neural networks that typically use a variation of multilayer perceptrons designed to require minimal preprocessing. A perceptron is a computer model or computerized machine devised to represent or simulate the ability of the brain to recognize and discriminate. This means that the network learns the filters (normally through a training process) needed to identify the features of interest; filters that in traditional algorithms were hand-engineered. This independence from prior knowledge and human effort in feature design is a major advantage of CNNs. CNNs have been successfully used for image (or more generally, visual) recognition and classification (e.g., identifying faces, objects and traffic signs) by using the "convolution" operator to extract features from the input image. Convolution preserves the spatial relationship between pixels by learning image features using input (more specifically, training) data.

In contrast to the CNN, a recurrent neural network (RNN) is a type of artificial neural network where connections between nodes form a directed graph along a sequence. This allows it to exhibit dynamic temporal behavior for a time sequence. Unlike feedforward neural networks, RNNs can use their internal state to process sequences of inputs. That is, RNNs have a feedback loop connected to their past decisions, which lets the RNN exhibit memory. For example, sequential information is preserved in the recurrent network's hidden state, which manages to span many time steps as it cascades forward to affect the processing of each new example. It is finding correlations between events separated by many moments, and these correlations are called "long-term dependencies", because an event downstream in time depends upon, and is a function of, one or more events that came before.

The neural network engine takes the training image(s) and performs the training accordingly, e.g., using the CNN(s) and/or RNN(s). In some embodiments, the neural network engine executes on one or more graphics processing units to leverage the parallel computing power. As discussed above, the training process can be iterative—by evaluating the performance and/or accuracy of the neural network process, the training system can determine if re-generating a different set of training images is necessary.

Figure 15A:
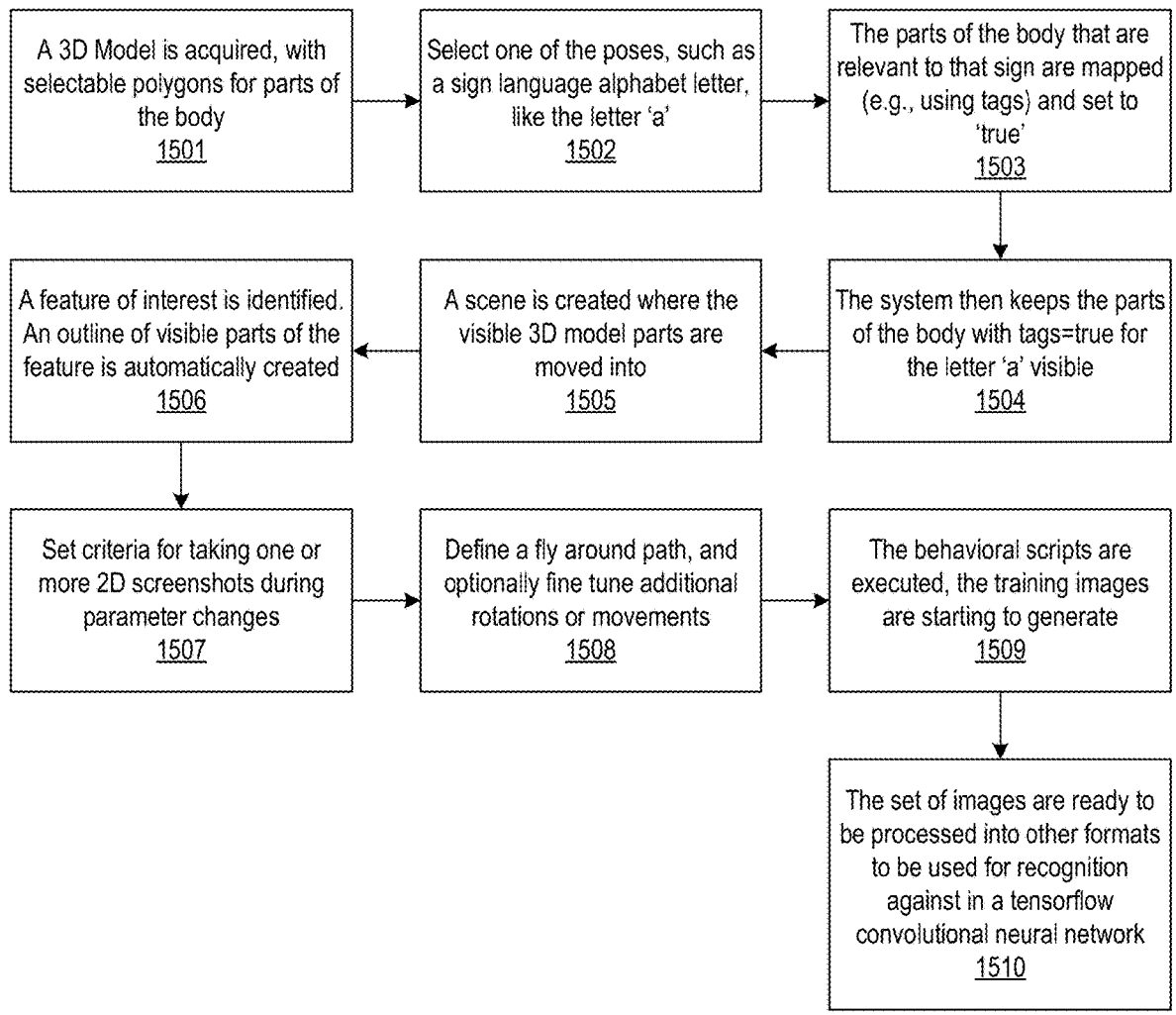
FIG. 15A illustrates a set of operations that are carried out to generate training images for a letter of the alphabet in accordance with an example embodiment of the disclosed technology.

FIG. 15A illustrates a set of operations that can be carried out by to generate training images for a letter (e.g., the letter "a") in the ASL in accordance with one or more embodiments of the disclosed technology.

Operation 1501: A 3D model of a human body is acquired. The 3D model includes selectable polygons for parts of the body.

Operation 1502: The training system selects one of the static poses—e.g., the letter "a" in the ASL—as the gesture.

Operation 1503: The system includes tags that can be turned on or off to map the model to the gesture. The parts of the model that are relevant to the sign of letter "a" are mapped (e.g., the polygons in these parts are marked as "true").

Operation 1504: The system keeps the mapped parts visible and makes the rest of the model invisible.

Operation 1505: A 3D scene is created to hold the visible parts to allow parameters changes by one or more scripts. The scripts control various scene parameters, such as rotations, translations, camera angles, lighting, etc.

Operation 1506: The system identifies a feature of interest. After the feature is identified, an outline of the visible parts of the feature (e.g., one or more bounding lines that form a precise boundary of the feature) is automatically generated.

Operation 1507: The system sets criteria for taking one or more 2D screenshots. For example, the system determines that a total of 50 images are needed as the training set. Other criteria, such as image resolution or number of features to be labeled, can also be set.

Operation 1508: The system determines, based on the criteria, a "fly-around" path in a specified time duration. The system can optionally determine additional parameters that can be changed in the time duration.

Operation 1509: The scripts are executed to generate the desired training images.

Operation 1510: The training images can be provided to a convolutional neural network (e.g., TensorFlow) to perform training. In some embodiments, the training images are converted to other formats that are compatible with the neural network process.

Figure 15B:
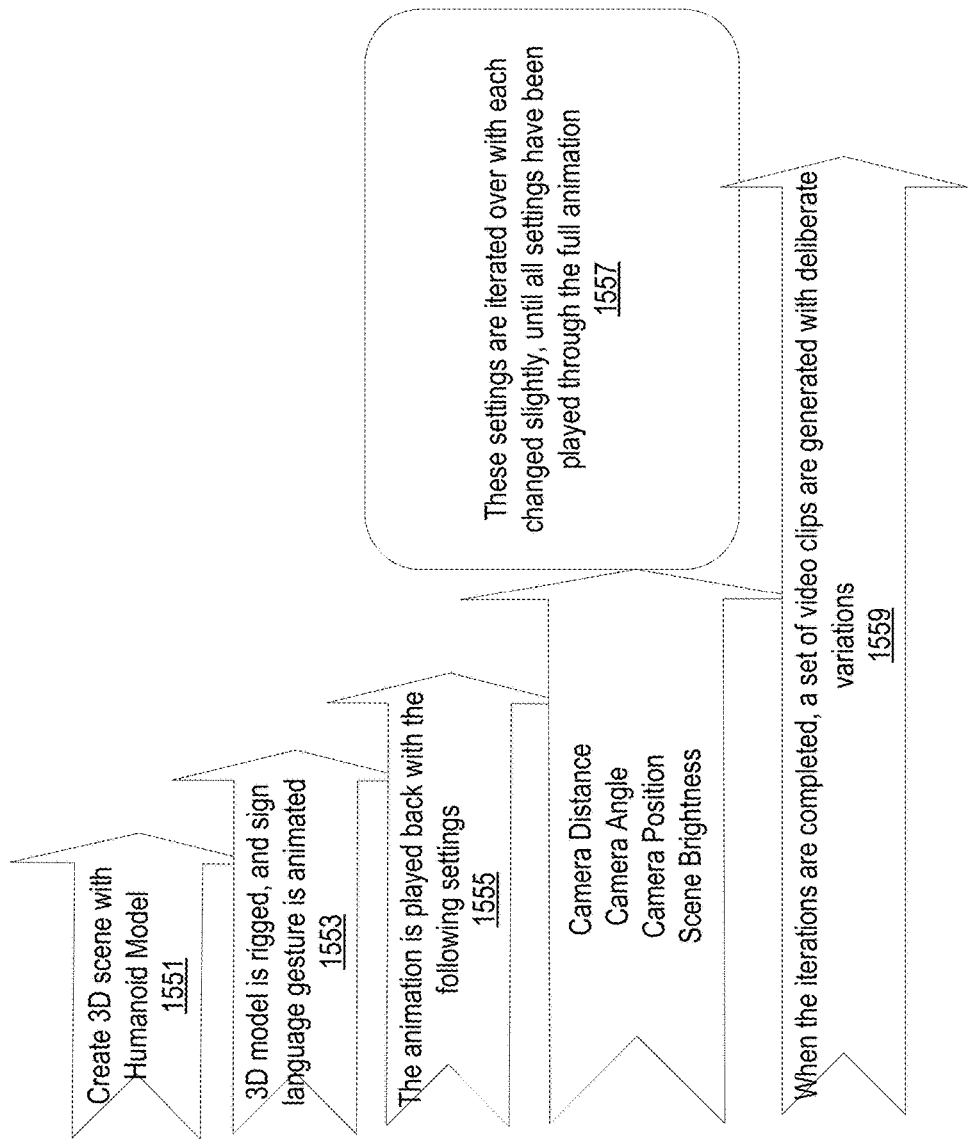
FIG. 15B depicts a high-level overview of 3D model generation work flow in accordance with an example embodiment of the disclosed technology.

FIG. 15B depicts a high-level overview of a three-dimensional (3D) model generation work flow in accordance with an example embodiment of the disclosed technology.

Operation 1551: A 3D scene is created with a Humanoid model. Each part of the model, with descriptive tag names.

Operation 1553: The model is rigged to depict a sign language gesture. The system can generate animations based on any tagged part of a model, or across all tags of a model. Each part of the model can be interacted with in all the ways the model's part is capable of, such as moving, rotating, and other similar kinds of movements. A first video clip can be created and output to the file system.

Operation 1555: The first video clip is played back with a set of settings that includes at least the camera distance from the object, the camera angle, the camera position, and the scene brightness.

Operation 1557: These settings are iterated over with each changed slightly, until all settings have been played through the full animation. For each iteration, a different video clip is generated.

Operation 1559: When the iterations are completed, a set of video clips are generated with deliberate variations. The video clips are now used to train the neural networks.

Figure 16:
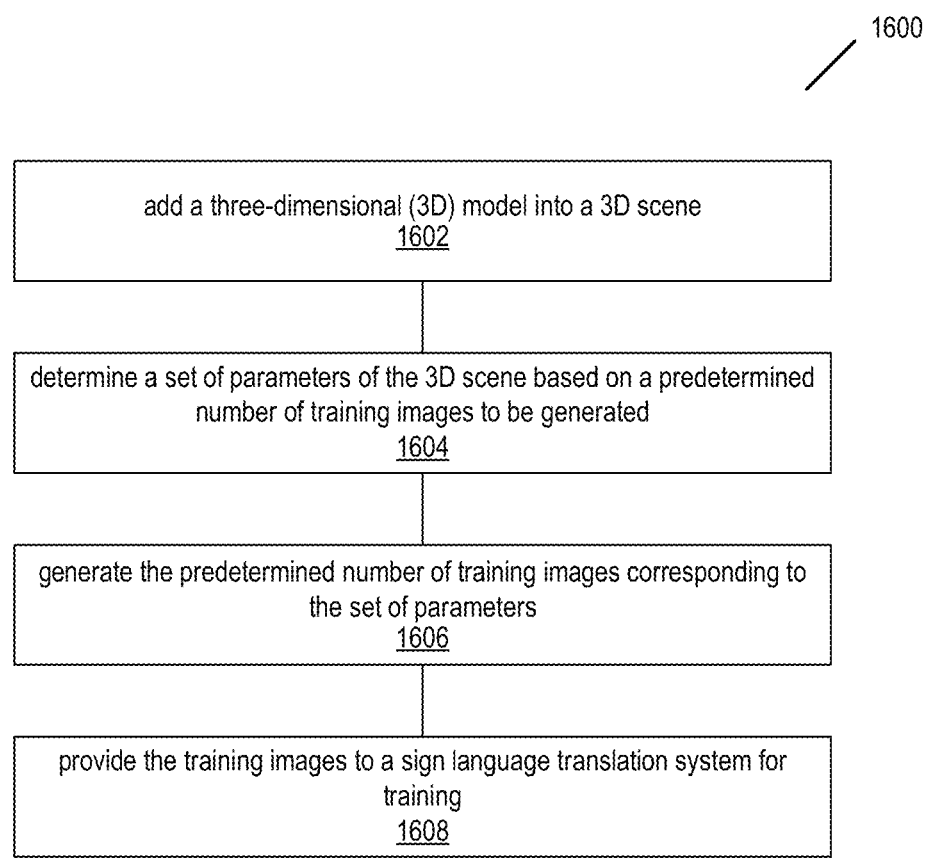
FIG. 16 illustrates a flowchart of an example method for training a sign language translation system in accordance with an example embodiment of the disclosed technology.

FIG. 16 shows a flowchart of an example method 1600 for training a sign language translation system in accordance with one or more embodiments of the disclosed technology. The method 1600 includes, at 1602, adding a three-dimensional (3D) model into a 3D scene. The 3D model is positioned to show a gesture that represents a letter, a word, or a phrase in a sign language. The method 1600 includes, at 1604, determining a set of parameters of the 3D scene based on a predetermined number of training images to be generated. The method 1600 includes, at 1606, generating the predetermined number of training images corresponding to the set of parameters. Each image is generated based on at least one value of the set of parameters, and at least a subset of the parameters is adjusted sequentially in a time domain. The method 1600 also includes, at 1608, providing the predetermined number of training images to a neural network learning engine of the sign language translation system to perform training.

Figure 17:
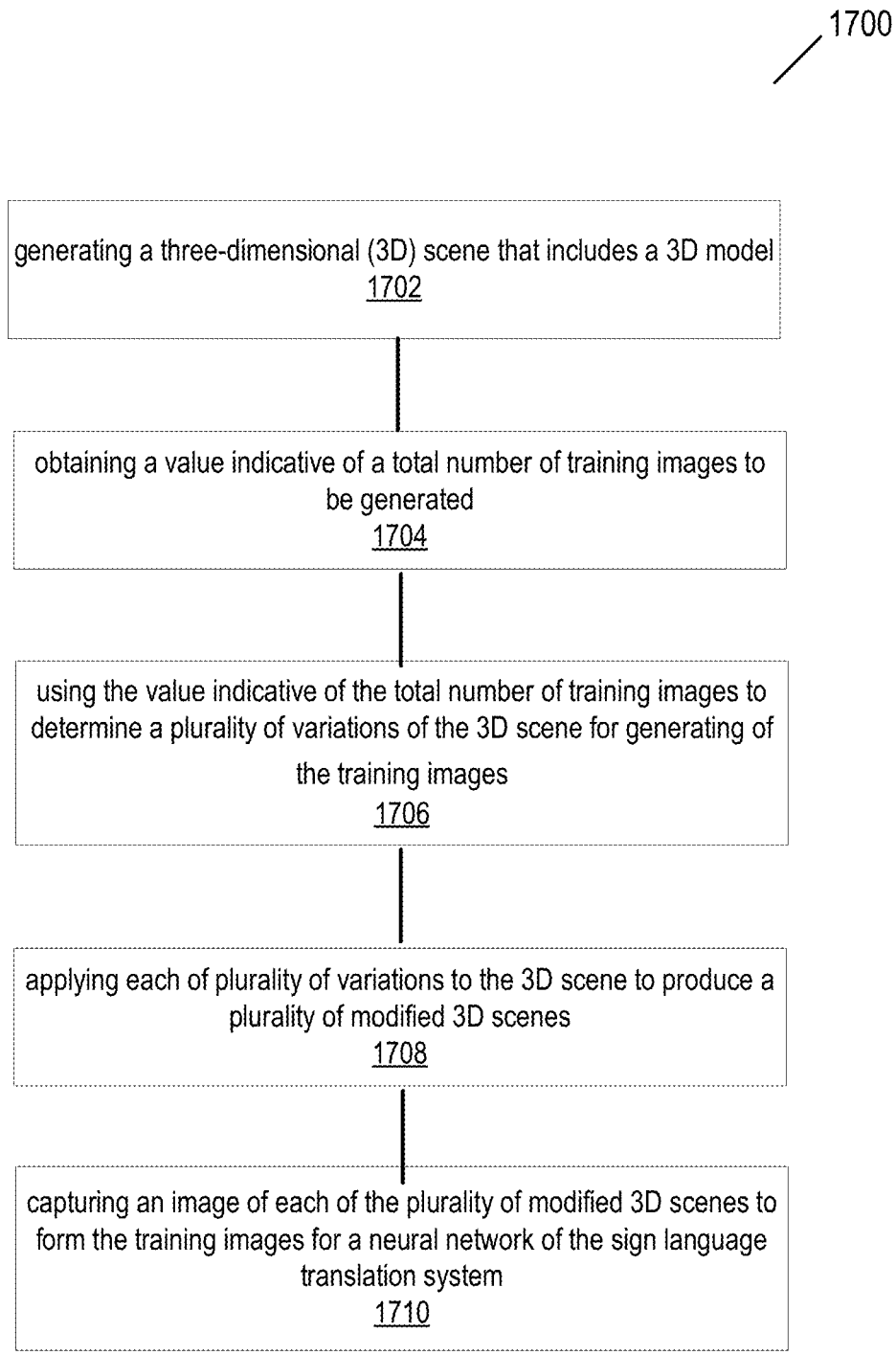
FIG. 17 illustrates a flowchart of another example method for training a sign language translation system in accordance with an example embodiment of the disclosed technology.

FIG. 17 shows a flowchart of an example method 1700 for providing training images for training a neural network of a sign language translation system in accordance with one or more embodiments of the disclosed technology. The method 1700 includes, at 1702, generating a three-dimensional (3D) scene that includes a 3D model representing at least a part of a human body. The 3D model is positioned in the 3D scene to simulate a gesture that represents a letter, a word, or a phrase in a sign language. The method 1700 includes, at 1704, obtaining a value indicative of a total number of training images to be generated. The method 1700 includes, at 1706, using the value indicative of the total number of training images to determine a plurality of variations of the 3D scene for generating of the training images. The method 1700 includes, at 1708, applying each of plurality of variations to the 3D scene to produce a plurality of modified 3D scenes. The method 1700 also includes, at 1710, capturing an image of each of the plurality of modified 3D scenes to form the training images for a neural network of the sign language translation system.

Figure 18:
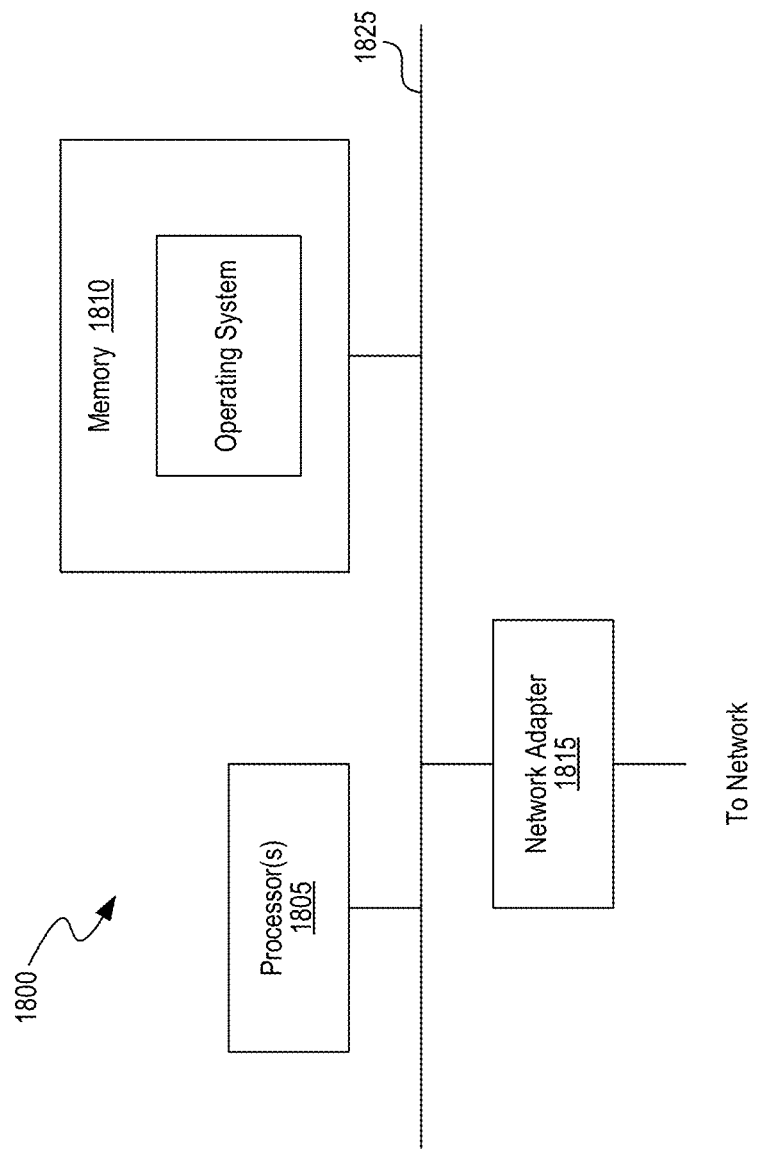
FIG. 18 is a block diagram illustrating an example of the architecture for a computer system or other control device that can be utilized to implement various portions of the presently disclosed technology.

FIG. 18 is a block diagram illustrating an example of the architecture for a computer system or other control device 1800 that can be utilized to implement various portions of the presently disclosed technology. In FIG. 18, the computer system 1800 includes one or more processors 1805 and memory 1810 connected via an interconnect 1825. The interconnect 1825 may represent any one or more separate physical buses, point to point connections, or both, connected by appropriate bridges, adapters, or controllers. The interconnect 1825, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 1805 may include central processing units (CPUs) to control the overall operation of, for example, the host computer. The processor(s) 1805 can also include one or more graphics processing units (GPUs). In certain embodiments, the processor(s) 1805 accomplish this by executing software or firmware stored in memory 1810. The processor(s) 1805 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 1810 can be or include the main memory of the computer system. The memory 1810 represents any suitable form of random access memory (RAM), read-only memory (ROM), flash memory, or the like, or a combination of such devices. In use, the memory 1810 may contain, among other things, a set of machine instructions which, upon execution by processor 1805, causes the processor 1805 to perform operations to implement embodiments of the presently disclosed technology.

Also connected to the processor(s) 1805 through the interconnect 1825 is a (optional) network adapter 1815. The network adapter 1815 provides the computer system 1800 with the ability to communicate with remote devices, such as the storage clients, and/or other storage servers, and may be, for example, an Ethernet adapter or Fiber Channel adapter.

Based on empirical data obtained using the disclosed techniques, it has been determined that a small amount of training images (e.g., around 50 images) is sufficient to train a pattern and gesture recognition system effectively. Thus, the number of training images can be greatly reduced. As the size of training data (e.g., the number of training images) becomes smaller, the performance of the training process is increased accordingly. For example, the reduction in processing can enable the implementation of the disclosed translation system using fewer hardware, software and/or power resources, such as implementation on a handheld device. Additionally, or alternatively, the gained computational cycles can be traded off to improve other aspects of the system. For example, in some implementations, a small number of training images allows the system to select more features in the 3D model. Thus, the training aspect can be improved due to the system's ability to recognize a larger number of classes/characteristics per training data set. Furthermore, because the features are labeled automatically with their precise boundaries (without introducing noise pixels), the accuracy of the training is also improved.

It is thus evident that the disclosed techniques can be implemented in various embodiments to optimize one or more aspects (e.g., performance, the number of classes/characteristics, accuracy) of the training process of an AI system that uses neural networks, such as a sign language translation system. It is further noted that while the provided examples focus on recognizing and translating sign languages, the disclosed techniques are not limited in the field of sign language translation and can be applied in other areas that require pattern and/or recognition. For example, the disclosed techniques can be used in various embodiments to train a pattern and gesture recognition system that includes a neural network learning engine.

In one example aspect, an apparatus for training a sign language translation system is disclosed. The apparatus includes a processor and a memory including processor executable code. The processor executable code, upon execution by the processor, causes the processor to generate a three-dimensional (3D) scene that includes a 3D model representing at least a part of a human body. The 3D model is positioned in the 3D scene to simulate a gesture that represents a letter, a word, or a phrase in a sign language. The processor executable code upon execution by the processor configures the processor to obtain a value indicative of a total number of training images to be generated, use the value indicative of the total number of training images to determine a plurality of variations of the 3D scene for generating of the training images, apply each of plurality of variations to the 3D scene to produce a plurality of modified 3D scenes, and capture an image of each of the plurality of modified 3D scenes to form the training images for a neural network of the sign language translation system.

In some embodiments, the processor executable code, upon execution by the processor, further configures the processor to, for each of the training images, automatically generate a label that corresponds to a feature of interest, the label comprising one or more bounding lines that delineates a precise boundary of the feature of interest. In some embodiments, the precise boundary of the feature of interest is generated based on a group of polygons that collectively form the feature of interest in the 3D model. In some embodiments, the feature of interest has an irregularly shaped boundary. In some embodiments, the feature of interest is associated with a hand movement. In some embodiments, the feature is associated with a non-manual activity.

In some embodiments, the processor executable code, upon execution by the processor, configures the processor to determine the plurality of variations of the 3D scene based on a set of parameters that specify at least one of: a position of the 3D model, an angle of 3D model, a position of a camera, an orientation of a camera, a lighting attribute, a texture of a subsection of the 3D model, or a background of the 3D scene. In some embodiments, the processor executable code, upon execution by the processor, configures the processor to apply each of plurality of variations to the 3D scene by changing the 3D scene in a temporal sequence in accordance with the set of parameters.

In some embodiments, the processor executable code, upon execution by the processor, further configures the processor to obtain an evaluation of the sign language translation system after the sign language translation system performs training and re-generate another set of training images upon a determination that the sign language translation system fails to meet one or more predetermined criteria. In some embodiments, the one or more predetermined criteria includes at least one of: a performance of the neural network, an accuracy of the neural network, or a number of characteristics that the neural network is capable of recognizing.

In some embodiments, the value indicative of a total number of training images is less than or equal to 50. In some embodiments, the processor executable code, upon execution by the processor, further configures the processor to obtain an evaluation of the sign language translation system for each of the training images one at a time and, for at least one of the training images, upon a determination that the sign language translation system performance in identifying a feature interest using the at least one of the training images has failed to improve from its performance based on a previous training image, discard the at least one training image.

In another example aspect, a method for providing training images for training a neural network of a sign language translation system is disclosed. The method includes generating a three-dimensional (3D) scene that includes a 3D model representing at least a part of a human body. The 3D model is positioned in the 3D scene to simulate a gesture that represents a letter, a word, or a phrase in a sign language. The method includes obtaining a value indicative of a total number of training images to be generated. The method includes using the value indicative of the total number of training images to determine a plurality of variations of the 3D scene for generating of the training images. The method includes applying each of plurality of variations to the 3D scene to produce a plurality of modified 3D scenes. The method also includes capturing an image of each of the plurality of modified 3D scenes to form the training images for a neural network of the sign language translation system.

In some embodiments, the method further includes, for each of the training images, automatically generating a label that corresponds to a feature of interest, the label comprising one or more bounding lines that delineates a precise boundary of the feature of interest. In some embodiments, the precise boundary of the feature of interest is generated based on a group of polygons that collectively form the feature of interest in the 3D model. In some embodiments, the feature of interest has an irregularly shaped boundary. In some embodiments, the feature of interest is associated with a hand movement. In some embodiments, the feature is associated with a non-manual activity.

In some embodiments, determining the plurality of variations of the 3D scene is based on a set of parameters that specify at least one of: a position of the 3D model, an angle of 3D model, a position of a camera, an orientation of a camera, a lighting attribute, a texture of a subsection of the 3D model, or a background of the 3D scene. In some embodiments, applying each of plurality of variations to the 3D scene includes changing the 3D scene in a temporal sequence in accordance with the set of parameters.

In some embodiments, the method further includes obtaining an evaluation of the sign language translation system after the sign language translation system performs training and re-generating another set of training images upon a determination that the sign language translation system fails to meet one or more predetermined criteria. In some embodiments, the one or more predetermined criteria includes at least one of: a performance of the neural network, an accuracy of the neural network, or a number of characteristics that the neural network is capable of recognizing.

In some embodiments, the value indicative of a total number of training images is less than or equal to 50. In some embodiments, the method further includes obtaining an evaluation of the sign language translation system for each of the training images one at a time and, for at least one of the training images, upon a determination that the sign language translation system performance in identifying a feature interest using the at least one of the training images has failed to improve from its performance based on a previous training image, discarding the at least one training image.

In another example aspect, a non-transitory computer readable medium having code stored thereon is disclosed. The code, upon execution by a processor, causes the processor to implement a method that includes generating a three-dimensional (3D) scene that includes a 3D model representing at least a part of a human body. The 3D model is positioned in the 3D scene to simulate a gesture that represents a letter, a word, or a phrase in a sign language. The method also includes obtaining a value indicative of a total number of training images to be generated, using the value indicative of the total number of training images to determine a plurality of variations of the 3D scene for generating of the training images, applying each of plurality of variations to the 3D scene to produce a plurality of modified 3D scenes, and capturing an image of each of the plurality of modified 3D scenes to form the training images for a neural network of the sign language translation system.

In some embodiments, the method further comprises, for each of the training images, automatically generating a label that corresponds to a feature of interest, the label comprising one or more bounding lines that delineates a precise boundary of the feature of interest. In some embodiments, the precise boundary of the feature of interest is generated based on a group of polygons that collectively form the feature of interest in the 3D model. In some embodiments, the feature of interest has an irregularly shaped boundary. In some embodiments, the feature of interest is associated with a hand movement. In some embodiments, the feature is associated with a non-manual activity.

In some embodiments, determining the plurality of variations of the 3D scene is based on a set of parameters that specify at least one of: a position of the 3D model, an angle of 3D model, a position of a camera, an orientation of a camera, a lighting attribute, a texture of a subsection of the 3D model, or a background of the 3D scene. In some embodiments, applying each of plurality of variations to the 3D scene includes changing the 3D scene in a temporal sequence in accordance with the set of parameters.

In some embodiments, the method further includes obtaining an evaluation of the sign language translation system after the sign language translation system performs training and re-generating another set of training images upon a determination that the sign language translation system fails to meet one or more predetermined criteria. In some embodiments, the one or more predetermined criteria includes at least one of: a performance of the neural network, an accuracy of the neural network, or a number of characteristics that the neural network is capable of recognizing.

In some embodiments, the value indicative of a total number of training images is less than or equal to 50. In some embodiments, the method further includes obtaining an evaluation of the sign language translation system for each of the training images one at a time and, for at least one of the training images, upon a determination that the sign language translation system performance in identifying a feature interest using the at least one of the training images has failed to improve from its performance based on a previous training image, discarding the at least one training image.

In another example aspect, an apparatus for training a pattern recognition system having a neural network engine is disclosed. The apparatus includes one or more processors and a memory including processor executable code. The processor executable code, upon execution by the one or more processors, causes the one or more processors to generate a three-dimensional (3D) scene that includes a 3D model representing an object. The 3D model comprising a plurality of polygonal subsections that collectively form the object. The processor executable code, upon execution by the one or more processors, also causes the one or more processors to determine a total number of training images to be generated for training the neural network, determine, based on the total number of training images, a plurality of parameter variations and applying each of plurality of the parameter variations to the 3D scene to produce a plurality of modified 3D scenes. The modified 3D scenes include at least one set of variations to a spatial position of the moving object in accordance with a temporal sequence. The processor executable code, upon execution by the one or more processors, also causes the one or more processors to capture an image of each of the plurality of modified 3D scenes to form the training images for the neural network learning engine, and, for each of the training images, automatically generate a label that corresponds to a feature of interest of the 3D model. The label includes one or more bounding lines that delineates a precise boundary of the feature of interest by combining an integer number of polygonal subsections of the 3D model.

In another example aspect, a method for training a sign language translation system is disclosed. The method includes adding a three-dimensional (3D) model into a 3D scene. The 3D model is positioned to show a gesture that represents a letter, a word, or a phrase in a sign language. The method includes determining a set of parameters of the 3D scene based on a predetermined number of training images to be generated and generating the predetermined number of training images corresponding to the set of parameters. Each image is generated based on at least one value of the set of parameters, and at least a subset of the parameters is adjusted sequentially in a time domain. The method also includes providing the predetermined number of training images to a neural network learning engine of the sign language translation system to perform training. In some embodiments, the predetermined number is less than or equal to 50.

In some embodiments, the method further includes obtaining an evaluation of the sign language translation system after the sign language translation system performs training; and re-generating a second set of training images when the evaluation indicates that the sign language translation system fails to meet one or more predetermined criteria. In some embodiments, the set of parameters of the 3D scene includes at least one of: a position of the 3D model, an angle of 3D model, a position of a camera, an orientation of the camera, a lighting attribute, a texture of a subsection of the 3D model, or a background of the 3D scene.

In some embodiments, the method further includes identifying a feature within the 3D model, wherein one or more of the predetermined number of training images include a label that corresponds to the feature. In some embodiments, the feature indicates a hand movement of the gesture. In some embodiments, the feature indicates a non-manual activity of the gesture. In some embodiments, the label includes one or more bounding lines that form a precise boundary of the feature. In some embodiments, the one or more bounding lines are automatically selected when the feature is identified.

In another example aspect, an apparatus for training a sign language translation system is disclosed. The apparatus includes a processor and a memory including processor executable code. The processor executable code, upon execution by the processor, causes the processor to add a three-dimensional (3D) model into a 3D scene. The 3D model is positioned to show a gesture that represents a letter, a word, or a phrase in a sign language. The processor executable code upon execution by the processor configures the processor to determine a set of parameters of the 3D scene based on a predetermined number of training images to be generated and generate the predetermined number of training images corresponding to the set of parameters. Each image is generated based on at least one value of the set of parameters, and at least a subset of the parameters is adjusted sequentially in a time domain. The processor executable code, upon execution by the processor, also configures the processor to provide the predetermined number of training images to a neural network learning engine of the sign language translation system to perform training. In some embodiments, the predetermined number is less than or equal to 50.

In some embodiments, the processor executable code, upon execution by the processor, configures the processor to obtain an evaluation of the sign language translation system after the sign language translation system performs training and re-generate a second set of training images when the evaluation indicates that the sign language translation system fails to meet one or more predetermined criteria. In some embodiments, the set of parameters of the 3D scene includes at least one of: a position of the 3D model, an angle of 3D model, a position of a camera, an orientation of the camera, a lighting attribute, a texture of a subsection of the 3D model, or a background of the 3D scene.

In some embodiments, the processor executable code, upon execution by the processor, further configures the processor to identify a feature within the 3D model, wherein one or more of the predetermined number of training images include a label that corresponds to the feature. In some embodiments, the feature indicates a hand movement of the gesture. In some embodiments, the feature indicates a non-manual activity of the gesture. In some embodiments, the label includes one or more bounding lines that form a precise boundary of the feature. In some embodiments, the one or more bounding lines are automatically selected when the feature is identified.

In yet another example aspect, a method for producing an image recognition system having a neural network engine is disclosed. The method includes adding a three-dimensional (3D) model into a 3D scene, determining a set of parameters of the 3D scene based on a predetermined number of training images to be generated, identifying a feature within the 3D model, and generating the predetermined number of training images corresponding to the set of parameters. Each image is generated based on at least one value of the set of parameters, and at least a subset of the parameters is adjusted sequentially in a time domain. One or more of the predetermined number of training images include a label that corresponds to the feature. The label is automatically selected based on one or more bounding lines that form a precise boundary of the feature. The predetermined number of training images forms a set of training images for the neural network learning engine of the image recognition system.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. An apparatus for using a sign language translation system, comprising:
    a processor, and
    a memory including processor executable code, wherein the processor executable code upon execution by the processor causes the processor to:
        perform, subsequent to using the sign language translation system to perform a training operation, an interpretation operation to identify and interpret input data,
        wherein the processor executable code upon execution by the processor configures the processor, as part of performing the training operation, to:
            generate a three-dimensional (3D) scene that includes a 3D model representing at least a part of a human body, the 3D model positioned in the 3D scene to simulate a gesture that represents a letter, a word, or a phrase in a sign language;
            obtain a value indicative of a total number of training images to be generated;
            use the value indicative of the total number of training images to determine a plurality of variations of the 3D scene for generating of training images;
            apply each of the plurality of variations to the 3D scene to produce a plurality of modified 3D scenes;
            capture an image of each of the plurality of modified 3D scenes to form the training images for a neural network of the sign language translation system; and
            automatically generate, for each of the training images, a label that corresponds to a feature of interest associated with the gesture, wherein the label comprises one or more bounding lines that delineates a precise boundary of the feature of interest, and wherein the precise boundary of the feature of interest is generated based on a group of polygons that collectively form the feature of interest in the 3D model.

2. The apparatus of claim 1, wherein the feature of interest has an irregularly shaped boundary.

3. The apparatus of claim 1, wherein the feature of interest is associated with a hand movement.

4. The apparatus of claim 1, wherein the feature of interest is associated with a non-manual activity.

5. The apparatus of claim 1, wherein the processor executable code upon execution by the processor configures the processor to determine the plurality of variations of the 3D scene based on a set of parameters that specify at least one of: a position of the 3D model, an angle of 3D model, a position of a camera, an orientation of the camera, a lighting attribute, a texture of a subsection of the 3D model, or a background of the 3D scene.

6. The apparatus of claim 5, wherein the processor executable code upon execution by the processor configures the processor to apply each of the plurality of variations to the 3D scene by changing the 3D scene in a temporal sequence in accordance with the set of parameters.

7. The apparatus of claim 1, wherein the processor executable code upon execution by the processor configures the processor to:
    obtain an evaluation of the sign language translation system after the sign language translation system uses the training images to perform the training operation; and
    re-generate another set of training images upon a determination that the sign language translation system fails to meet one or more predetermined criteria.

8. The apparatus of claim 7, wherein the one or more predetermined criteria includes at least one of: a performance of the neural network, an accuracy of the neural network, or a number of characteristics that the neural network is capable of recognizing.

9. The apparatus of claim 1, wherein the value indicative of the total number of training images is less than or equal to 50.

10. The apparatus of claim 1, wherein the processor executable code upon execution by the processor causes the processor to:
    obtain an evaluation of the sign language translation system for each of the training images one at a time; and
    for at least one of the training images, upon a determination that a performance of the sign language translation system in identifying a feature of interest using the at least one of the training images has failed to improve from its performance based on a previous training image, discard the at least one of the training images.

11. A method for using a neural network of a sign language translation system, comprising:
    performing, subsequent to using the sign language translation system to perform a training operation, an interpretation operation to identify and interpret input data, wherein the training operation comprises:
        generating a three-dimensional (3D) scene that includes a 3D model representing at least a part of a human body, the 3D model positioned in the 3D scene to simulate a gesture that represents a letter, a word, or a phrase in a sign language;
        obtaining a value indicative of a total number of training images to be generated;
        using the value indicative of the total number of training images to determine a plurality of variations of the 3D scene for generating of training images;
        applying each of the plurality of variations to the 3D scene to produce a plurality of modified 3D scenes;
        capturing an image of each of the plurality of modified 3D scenes to form the training images for the neural network of the sign language translation system; and
        automatically generating, for each of the training images, a label that corresponds to a feature of interest associated with the gesture, wherein the label comprises one or more bounding lines that delineates a precise boundary of the feature of interest, and wherein the precise boundary of the feature of interest is generated based on a group of polygons that collectively form the feature of interest in the 3D model.

12. The method of claim 11, wherein the feature of interest has an irregularly shaped boundary.

13. The method of claim 11, wherein the feature of interest is associated with a hand movement.

14. The method of claim 11, wherein the feature of interest is associated with a non-manual activity.

15. The method of claim 11, wherein determining the plurality of variations of the 3D scene is based on a set of parameters that specify at least one of: a position of the 3D model, an angle of 3D model, a position of a camera, an orientation of the camera, a lighting attribute, a texture of a subsection of the 3D model, or a background of the 3D scene.

16. The method of claim 15, wherein applying each of the plurality of variations to the 3D scene includes changing the 3D scene in a temporal sequence in accordance with the set of parameters.

17. The method of claim 11, wherein the training operation further comprises:
obtaining an evaluation of the sign language translation system after the sign language translation system performs training; and
re-generating another set of training images upon a determination that the sign language translation system fails to meet one or more predetermined criteria.

* * * * *